US010956664B2

(12) United States Patent
Kakkad et al.

(10) Patent No.: US 10,956,664 B2
(45) Date of Patent: Mar. 23, 2021

(54) AUTOMATED FORM GENERATION AND ANALYSIS

(71) Applicant: Accenture Global Solutions Limited, Dublin (IE)

(72) Inventors: Hemant Kakkad, Mumbai (IN); Kinnar Shashikant Galani, Mumbai (IN); Nitin Kumar Gupta, Ghaziabad (IN)

(73) Assignee: Accenture Global Solutions Limited, Dublin (IE)

( * ) Notice: Subject to any disclaimer, the term of this patent is extended or adjusted under 35 U.S.C. 154(b) by 277 days.

(21) Appl. No.: 15/358,871

(22) Filed: Nov. 22, 2016

(65) Prior Publication Data

US 2018/0143958 A1 May 24, 2018

(51) Int. Cl.
*G06F 40/174* (2020.01)
*G06F 16/951* (2019.01)
*G06F 40/20* (2020.01)

(52) U.S. Cl.
CPC .......... *G06F 40/174* (2020.01); *G06F 16/951* (2019.01); *G06F 40/20* (2020.01)

(58) Field of Classification Search
CPC ...... G06F 17/24; G06F 40/174; G06F 16/951; G06F 40/20
USPC ........................................................ 715/223
See application file for complete search history.

(56) References Cited

U.S. PATENT DOCUMENTS 8,095,476 B2 * 1/2012 Bierner ................. G06Q 99/00
705/500
9,990,678 B1 * 6/2018 Cabrera ............... G06Q 40/123

2004/0098285 A1 5/2004 Breslin et al.
2007/0168382 A1 7/2007 Tillberg et al.
2008/0028435 A1 * 1/2008 Strickland ............ G06Q 10/083
726/1
2008/0313529 A1 12/2008 Gwozdz et al.
2013/0212638 A1 8/2013 Wilson
(Continued)

FOREIGN PATENT DOCUMENTS

WO 2014/088574 6/2014

OTHER PUBLICATIONS

Australian Examiner's First Report corresponding to AU 2017200270 dated Aug. 18, 2017, 8 pages.
(Continued)

*Primary Examiner* — Kavita Stanley
*Assistant Examiner* — Tionna M Burke
(74) *Attorney, Agent, or Firm* — Harrity & Harrity, LLP

(57) ABSTRACT

A device may receive form analysis information to be used to analyze a form for an organization. The form analysis information may include an industry profile associated with the organization, a government regulation that governs the organization, and a form field justification that indicates a justification for including a particular field in the form. The device may analyze the form based on the form analysis information and based on one or more fields included in the form. The device may generate one or more scores for the one or more fields based on analyzing the form. The one or more scores may be generated based on the industry profile, the government regulation, and the form field justification. The device may perform one or more automated actions in association with the form based on the one or more scores.

20 Claims, 27 Drawing Sheets

(56) References Cited

U.S. PATENT DOCUMENTS

| | | | |
|---|---|---|---|
| 2013/0276136 A1 | 10/2013 | Goodwin et al. | |
| 2014/0172495 A1* | 6/2014 | Schneck | G06Q 10/0635 |
| | | | 705/7.28 |
| 2014/0244463 A1* | 8/2014 | Reimer | G06Q 40/00 |
| | | | 705/35 |
| 2014/0373182 A1 | 12/2014 | Peri et al. | |
| 2016/0164915 A1 | 6/2016 | Cook | |
| 2016/0203217 A1* | 7/2016 | Anisingaraju | G06F 17/30705 |
| | | | 707/738 |

OTHER PUBLICATIONS

PWC, "Data Protection and Privacy," http://www.pwc.com/us/en/risk-assurance-services/third-party-assurance/data-protection-privacy.html, Nov. 10, 2014, 2 pages.

Privacy Patterns, "Privacy dashboard," https://privacypatterns.org/patterns/Privacy-dashboard, Aug. 8, 2011, 2 pages.

* cited by examiner

AUTOMATED FORM GENERATION AND ANALYSIS

BACKGROUND

An organization, such as a business or government agency, may often have a need to collect information. Collected information may include sensitive information, such as classified information, confidential business information, or the like. Collected information may also include personally identifiable information, such as information that can be used to distinguish or trace an individual's identity (e.g., name, social security number, date and place of birth, mother's maiden name, or biometric records) or any other information that is linked or linkable to an individual (e.g., medical, educational, financial, or employment information). Significant privacy concerns may exist, however, when sensitive information or personally identifiable information is collected by an organization.

SUMMARY

In some implementations, a device may include one or more processors to receive form analysis information to be used to analyze a computer-implemented form for an organization. The form analysis information may include an industry profile associated with the organization, a government regulation that governs the organization, and a form field justification that indicates a justification for including a particular field in the computer-implemented form. The one or more processors may analyze the computer-implemented form based on the form analysis information and based on one or more fields included in the computer-implemented form. The one or more processors may generate one or more scores for the one or more fields based on analyzing the computer-implemented form. The one or more scores may be generated based on the industry profile, the government regulation, and the form field justification. The one or more processors may perform one or more automated actions in association with the computer-implemented form based on the one or more scores.

In some implementations, a method may include obtaining, by one or more devices, form analysis information to be used to analyze a form for an organization. The form analysis information may include an industry profile associated with the organization, a government regulation that governs the organization, and a form field justification that indicates a justification for including a particular field in the form. The method may include analyzing, by the one or more devices, the form based on the form analysis information and based on one or more fields included in the form. The method may include generating, by the one or more devices, one or more scores for the one or more fields based on analyzing the form. The one or more scores may be generated based on the industry profile, the government regulation, and the form field justification. The method may include performing, by the one or more devices, one or more automated actions in association with the form based on the one or more scores.

In some implementations, a non-transitory computer-readable medium may store one or more instructions that, when executed by one or more processors, cause the one or more processors to receive form analysis information to be used to analyze a potential form for an organization. The form analysis information may include at least one of an industry profile associated with the organization, a government regulation that governs the organization, or a form field justification that indicates a justification for including a particular field in the potential form. The one or more instructions may cause the one or more processors to analyze the potential form based on the form analysis information and based on a plurality of fields to be included in the potential form. The one or more instructions may cause the one or more processors to generate scores for the plurality of fields based on analyzing the potential form. The scores may be generated based on at least one of the industry profile, the government regulation, or the form field justification. The one or more instructions may cause the one or more processors to perform one or more automated actions in association with the potential form based on the scores.

BRIEF DESCRIPTION OF THE DRAWINGS

FIGS. 5-27 are diagrams of example implementations relating to the example process shown in FIG. 4.

DETAILED DESCRIPTION

The following detailed description of example implementations refers to the accompanying drawings. The same reference numbers in different drawings may identify the same or similar elements.

Organizations may use forms (e.g., computer-implemented forms, such as electronic forms, web forms, etc.) to obtain data from users, such as customers, patients, students, employees, or stakeholders, other organizations, or the like. Such data may have varying degrees of sensitivity, and may be governed by different data privacy laws and policies depending on the nature of the data, a governing jurisdiction (e.g., a jurisdiction that governs an organization, a user, etc.), an industry of the organization, policies of the organization, agreements between the organization and users, the likelihood of a data breach, the consequences of a data breach, or the like. For example, a data privacy law may result in legal punishment if broken, such as if personal information is used without consent. As another example, a data privacy policy may refer to a best practice in handling data privacy to reduce risk, but that does not result in legal punishment if broken, such as a policy to delete stale data. Due to the number of factors that impact the risk of obtaining different types of data, it may be difficult to accurately assess, using subjective judgment and intuition, a level of risk associated with a form used to gather the data. Furthermore, it may be difficult to generate forms that meet organizational needs based on the number of factors to be considered for form generation.

Implementations described herein use a form analysis platform, implemented within a cloud computing environment, to generate and analyze forms using well-defined rules (e.g., rules that define an objective action to be a taken when a condition is satisfied), and to provide an accurate assessment of the level of risk associated with forms used to obtain potentially sensitive data. In some implementations, the form analysis platform uses natural language processing, artificial intelligence, machine learning, big data analysis, web crawling, or another automated technique to accurately determine the level of risk, to provide recommendations regarding a form, to perform an automated action for a form, or the like. By using these automated techniques, the form analysis platform provides an accurate and objective analysis of forms, provides a consistent analysis of forms so that multiple forms can be compared, and improves security by reducing the likelihood and impact of data breaches associated with data obtained using the forms. This analysis may be more consistent than subjective techniques used to analyze forms. While some implementations are described herein in connection with a single form, the techniques described herein may be applied to hundreds, thousands, millions, or more forms.

Figure 1:
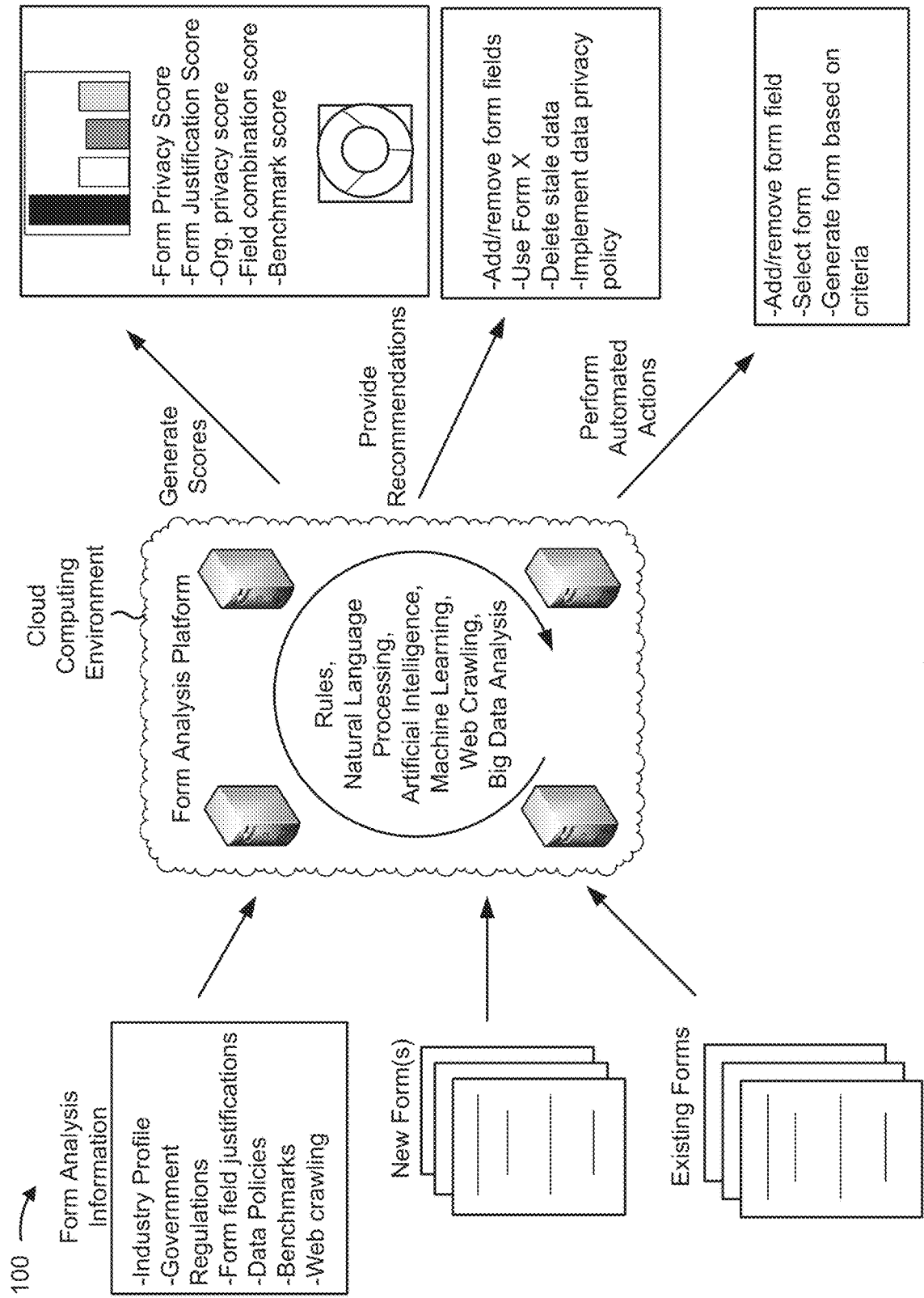
FIG. 1 is a diagram of an overview of an example implementation described herein.

FIG. 1 is a diagram of an overview of an example implementation 100 described herein. As shown in FIG. 1, example implementation 100 includes a cloud computing environment, which includes a form analysis platform. As shown, the form analysis platform may obtain form analysis information, which may include industry profile information, government regulations, form field justifications, data policies, and/or benchmarking information.

In some implementations, the form analysis information may be input by a user, such as via a user interface provided by the form analysis platform. Additionally, or alternatively, the form analysis information may be obtained from external devices. For example, the form analysis platform may use artificial intelligence, web crawling, and/or natural language processing to obtain information about the organization, the organization's industry, government regulations that apply to data privacy, benchmarking to obtain relevant forms that exist on the web, or the like.

As further shown in FIG. 1, the form analysis platform may generate and/or analyze one or more forms (e.g., a new form and/or an existing form) based on the form analysis information. For example, as shown, the form analysis platform may apply rules, natural language processing, artificial intelligence, machine learning, web crawling, big data analysis, etc., to analyze a form.

As further shown in FIG. 1, the form analysis platform may generate scores based on analyzing the form(s). For example, the form analysis platform may generate a form privacy score, a form justification score, an organizational privacy score, a field combination score, a benchmark score, or the like, as described in more detail elsewhere herein. Additionally, or alternatively, the form analysis platform may provide recommendations based on analyzing the form(s). For example, the form analysis platform may generate a recommendation to add or remove form fields, to use a particular form, to delete stale data, to implement a data privacy policy, or the like, as described in more detail elsewhere herein. Additionally, or alternatively, the form analysis platform may perform automated actions based on analyzing the form(s). For example, the form analysis platform may perform an automated action to add or remove a form field, to select a particular form, to generate a form based on criteria, or the like, as described in more detail elsewhere herein.

By using automated techniques as described above, the form analysis platform provides an accurate and objective analysis of forms, provides a more consistent analysis of forms so that multiple forms can be compared, and improves security by reducing the likelihood and impact of data breaches associated with data obtained using the forms.

As indicated above, FIG. 1 is provided merely as an example. Other examples are possible and may differ from what was described with regard to FIG. 1.

Figure 2:
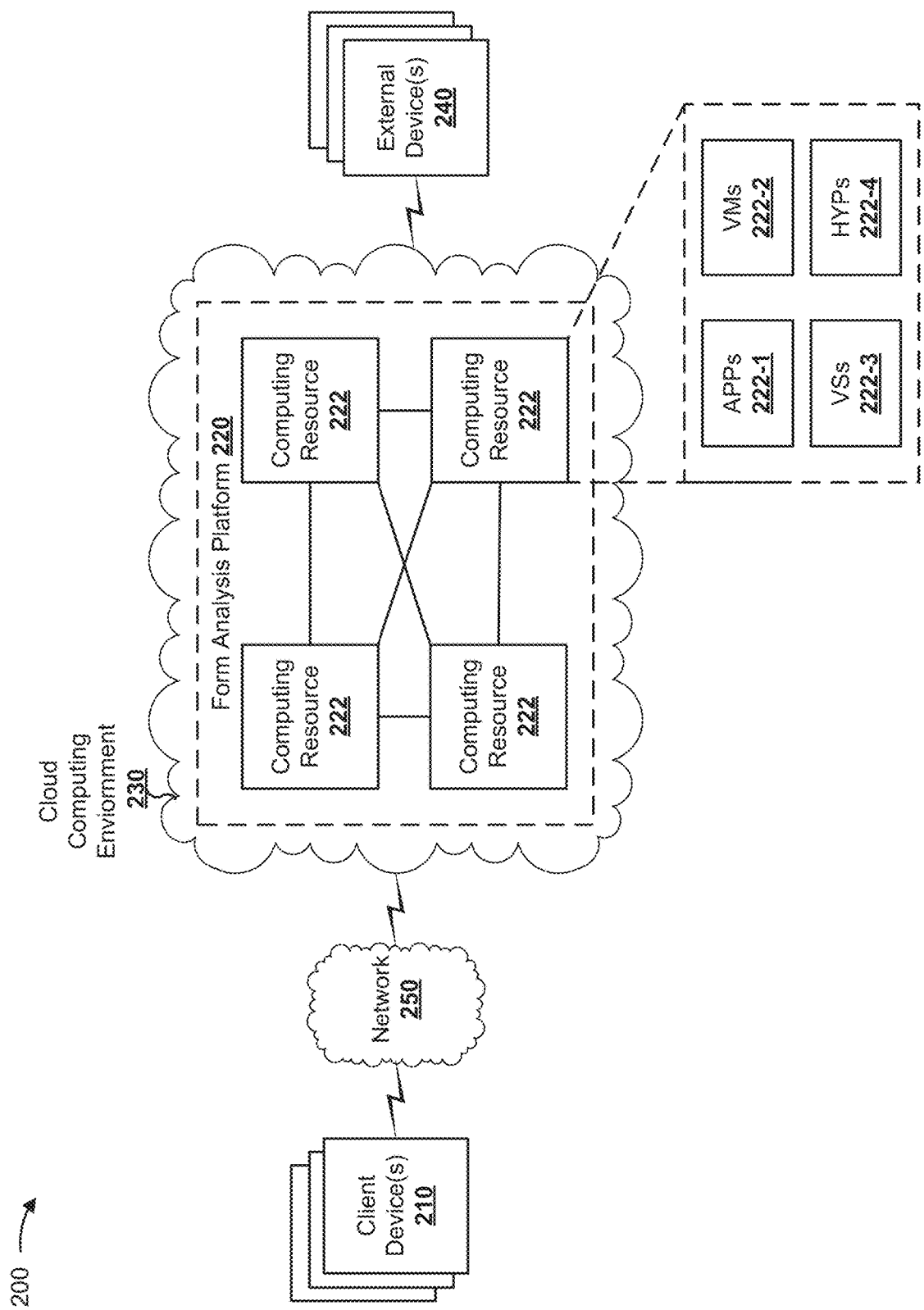
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of client devices 210, a form analysis platform 220, a cloud computing environment 230, a set of external devices 240, and a network 250. Devices of environment 200 may interconnect via wired connections, wireless connections, or a combination of wired and wireless connections.

Client device 210 includes one or more devices capable of receiving, generating, storing, processing, and/or providing information associated with form generation and/or form analysis. For example, client device 210 may include a communication and/or computing device, such as a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Client device 210 may be used to access form analysis platform 220, to provide information to form analysis platform 220, and/or to receive information from form analysis platform 220.

Form analysis platform 220 includes one or more devices capable of receiving, generating, storing, processing, updating, and/or providing information associated with generating and/or analyzing a form. For example, form analysis platform 220 may include a cloud server or a group of cloud servers.

In some implementations, as shown, form analysis platform 220 may be hosted in cloud computing environment 230. Notably, while implementations described herein describe form analysis platform 220 as being hosted in cloud computing environment 230, in some implementations, form analysis platform 220 may not be cloud-based (i.e., may be implemented outside of a cloud computing environment) or may be partially cloud-based.

Cloud computing environment 230 includes an environment that hosts form analysis platform 220. Cloud computing environment 230 may provide computation, software, data access, storage, and/or other services that do not require end-user knowledge of a physical location and configuration of system(s) and/or device(s) that host form analysis platform 220. As shown, cloud computing environment 230 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host form analysis platform 220. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by client device 210. Application 222-1 may eliminate a need to install and execute the software applications on client device 210. For example, application 222-1 may include software associated with form analysis platform 220 and/or any other software capable of being provided via cloud computing environment 230. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 210), and may manage infrastructure of cloud computing environment 230, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

External device 240 includes one or more devices capable of providing information to form analysis platform 220 to assist with form generation and/or analysis. For example, external device 240 may include a server, such as a web server or a database server. In some implementations, form analysis platform 220 may crawl one or more external devices 240 (e.g., web servers) to obtain information to be used for form generation and/or analysis.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
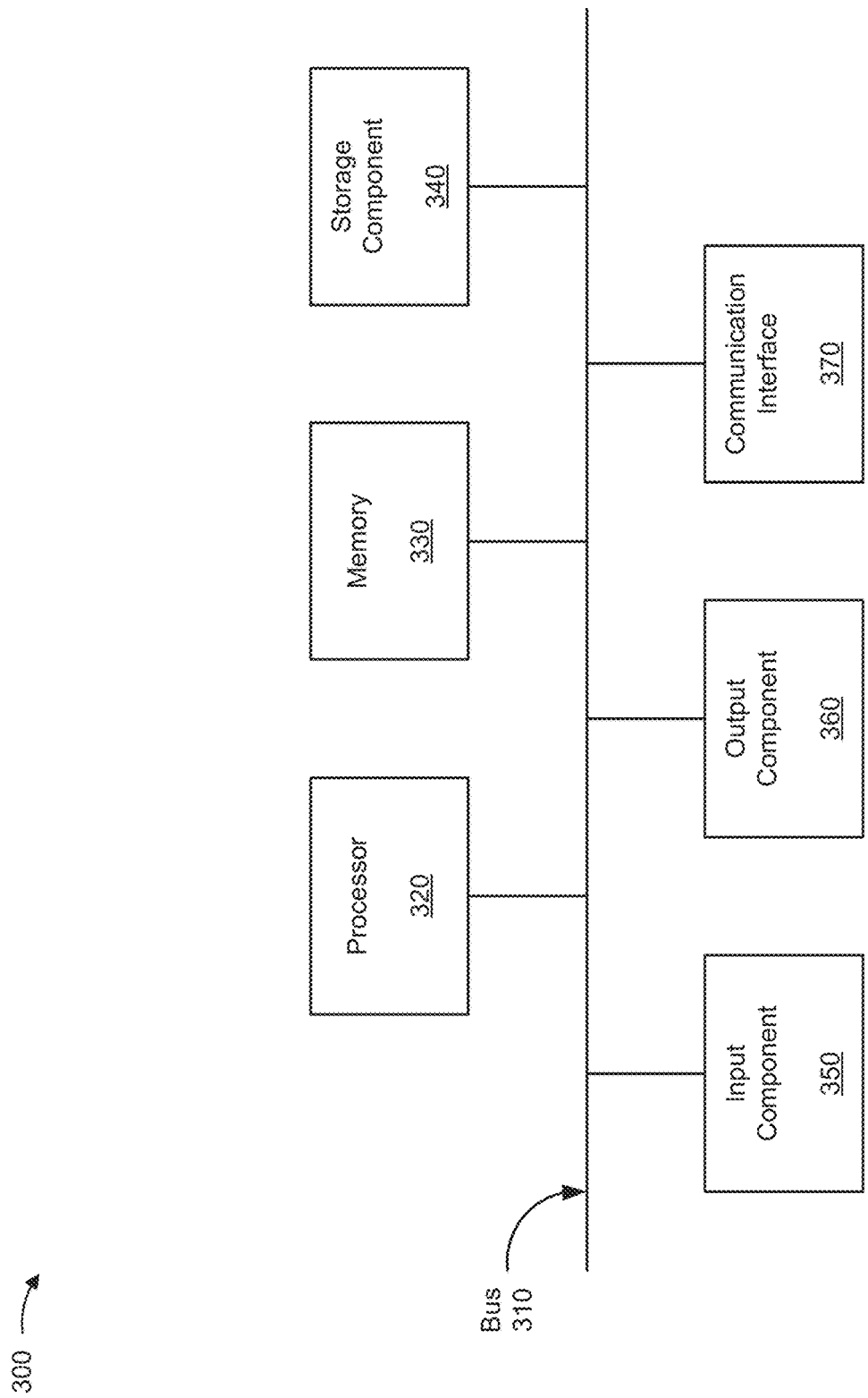
FIG. 3 is a diagram of example components of one or more devices of FIG. 2.

FIG. 3 is a diagram of example components of a device 300. Device 300 may correspond to client device 210, form analysis platform 220, computing resource 222, and/or external device 240. In some implementations, client device 210, form analysis platform 220, computing resource 222, and/or external device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
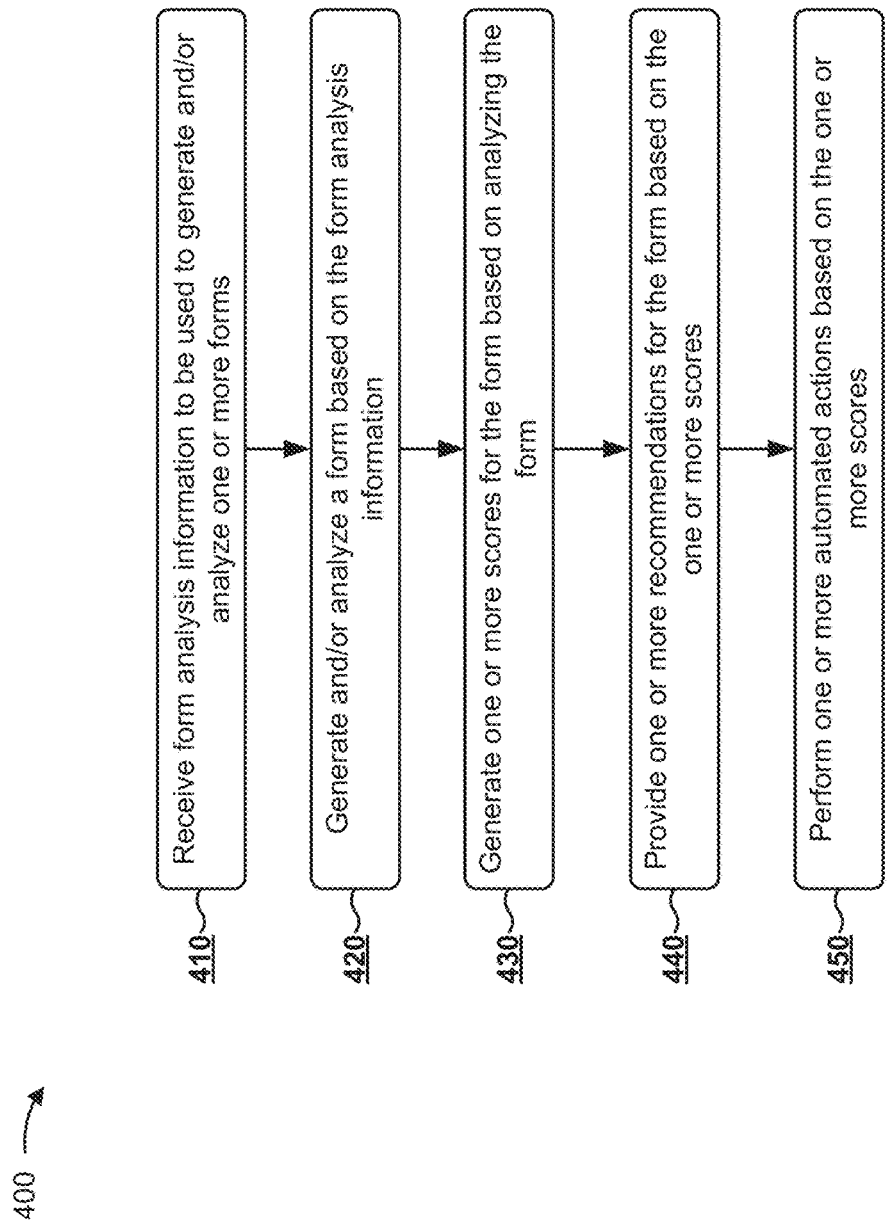
FIG. 4 is a flow chart of an example process for automated form generation and analysis.

FIG. 4 is a flow chart of an example process 400 for automated form generation and analysis. In some implementations, one or more process blocks of FIG. 4 may be performed by form analysis platform 220. In some implementations, one or more process blocks of FIG. 4 may be performed by another device or a group of devices separate from or including form analysis platform 220, such as client device 210 and/or external device 240.

As shown in FIG. 4, process 400 may include receiving form analysis information to be used to generate and/or analyze one or more forms (block 410). For example, form analysis platform 220 may receive form analysis information to be used to generate and/or analyze the forms. In some implementations, form analysis platform 220 may generate a new form to be analyzed. Additionally, or alternatively, form analysis platform 220 may analyze an existing form.

In some implementations, the form analysis information may include industry profile information relating to an organization, such as information that identifies an industry of the organization, a sector of the organization, a department of the organization, a geographic location of the organization, a name of the organization, one or more competitors of the organization, or the like. Additionally, or alternatively, the form analysis information may include government regulation information, such as international regulations, national regulations, state regulations, local regulations, regional regulations, etc. regarding data privacy. Additionally, or alternatively, the form analysis information may include form field justifications, such as a justification for including a particular field in the form to request a particular type of data (e.g., an indication of why the organization needs the data). Additionally, or alternatively, the form analysis information may identify a data policy, such as organization-specific policies regarding data acquisition, data storage, data retention, or the like. Additionally, or alternatively, the form analysis information may include benchmarking information, such as information that indicates one or more field types that other organizations are including in their forms, information that identifies data that other organizations are gathering, information that identifies a manner in which those organizations are safeguarding information, or the like.

In some implementations, the form analysis information may be input by a user. For example, a single user may input the form analysis information, or multiple users may provide different portions and/or different types of form analysis information. Additionally, or alternatively, the form analysis information may be determined by form analysis platform 220, such as by using natural language processing, database analysis, and/or web crawling.

As an example, a user may input an organization uniform resource locator (URL), and form analysis platform 220 may scan a corresponding website to determine an organization name, industry, geographic location, sector, or the like. Additionally, or alternatively, form analysis platform 220 may scan a website (e.g., a business website, Wikipedia, etc.) to determine competitors of the organization. Additionally, or alternatively, form analysis platform 220 may scan a website to determine what jurisdiction(s) the organization operates in (e.g., a country, a region, a state, a local area, etc.). Additionally, or alternatively, form analysis platform 220 may scan one or more websites to determine retention policies of the organization and/or of competitors of the organization.

In some implementations, form analysis platform 220 may predict a type of data the organization needs to gather, and/or may predict a justification for gathering the data, based on a type of the organization, industry, or the like. In some implementations, form analysis platform 220 may scan one or more websites for web forms that gather data predicted to be needed by the organization. For example, form analysis platform 220 may scan one or more websites to obtain benchmarking information, and may analyze the forms as described below to provide scores for benchmarking.

Figure 5:
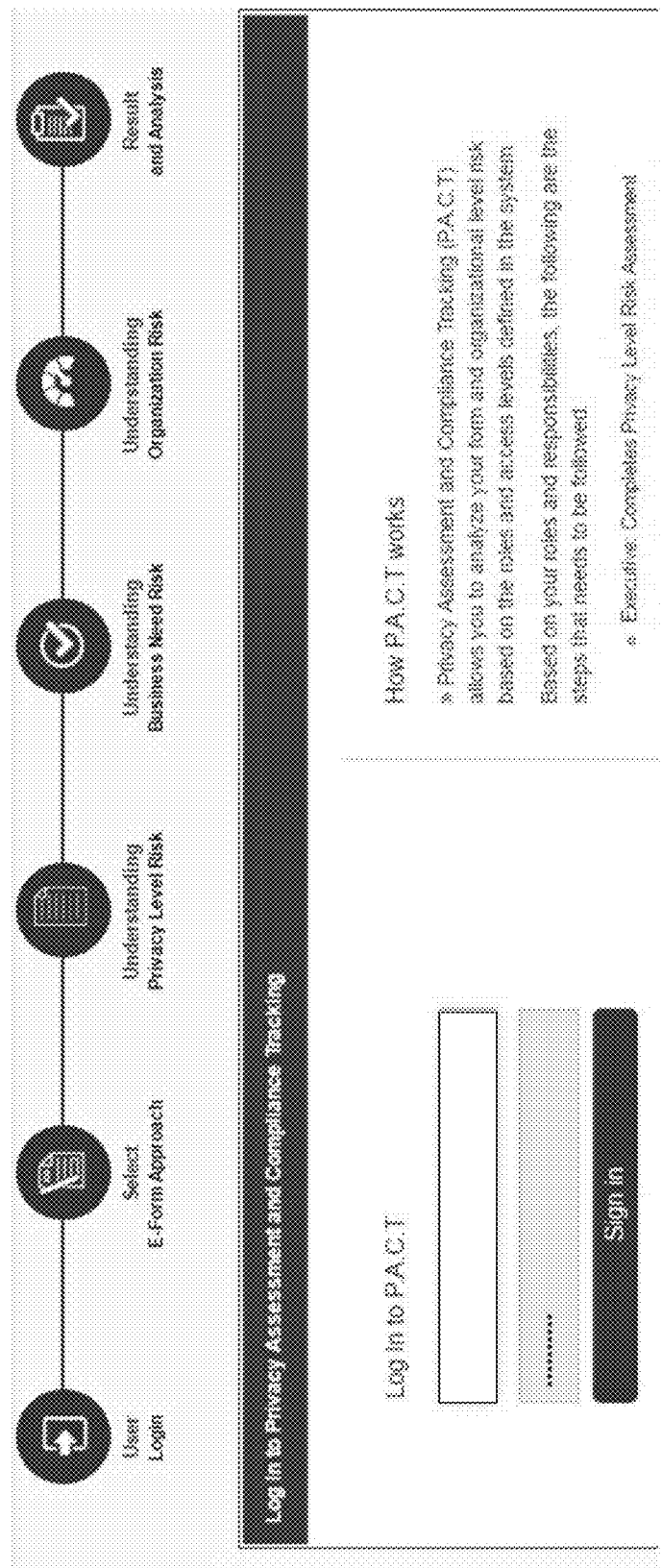
Figure 6:
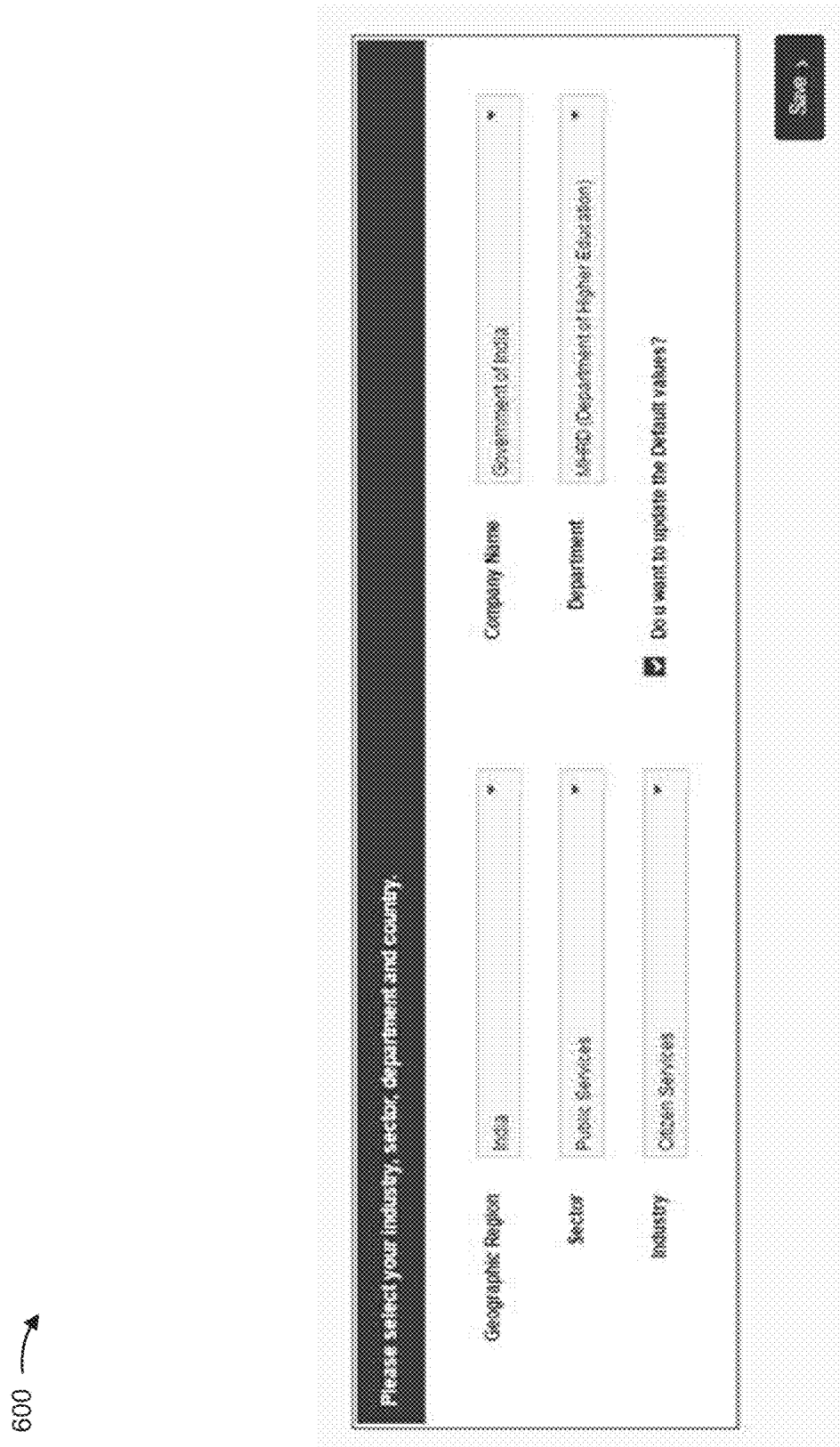
Figure 13:
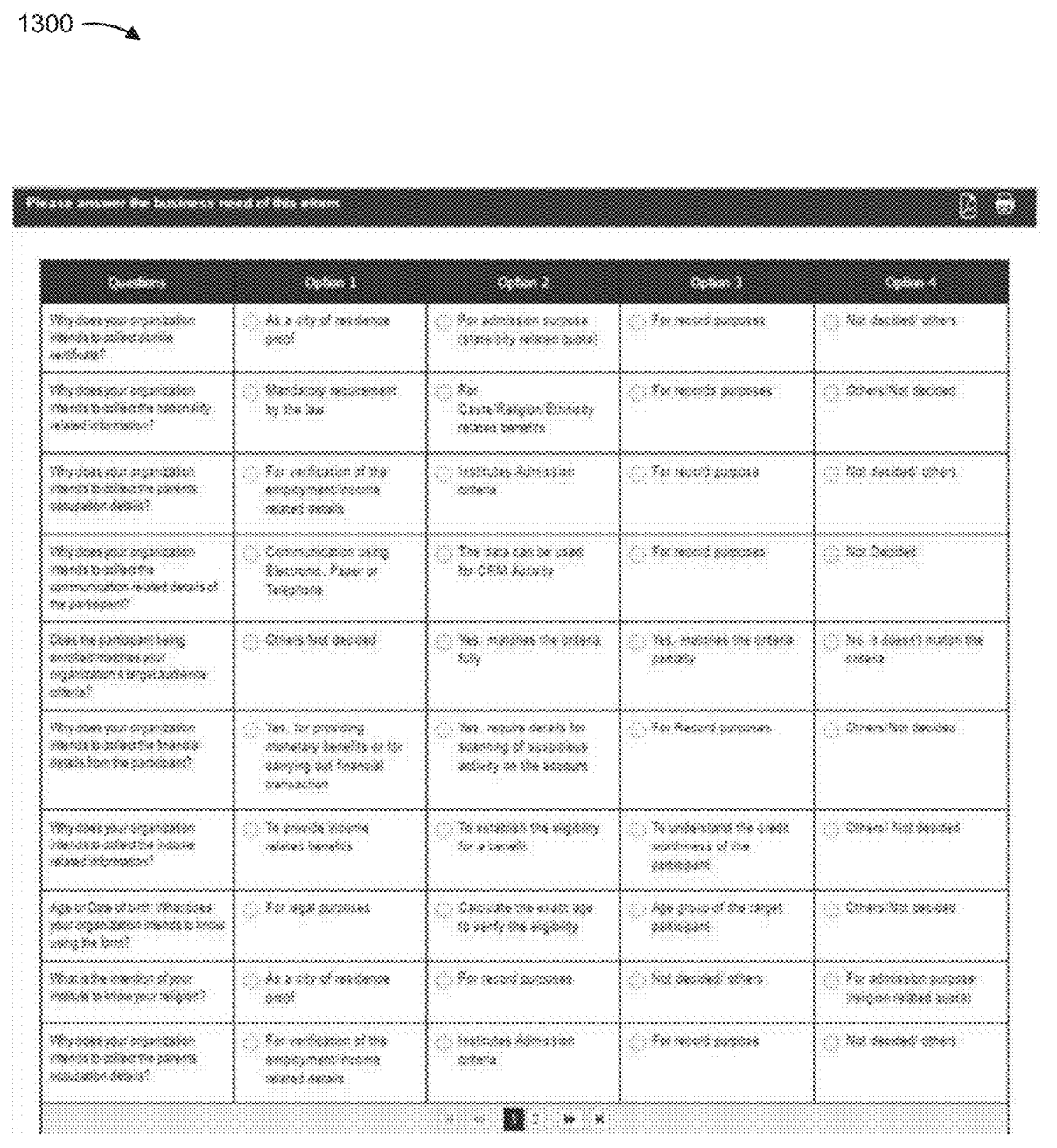
Figure 16:
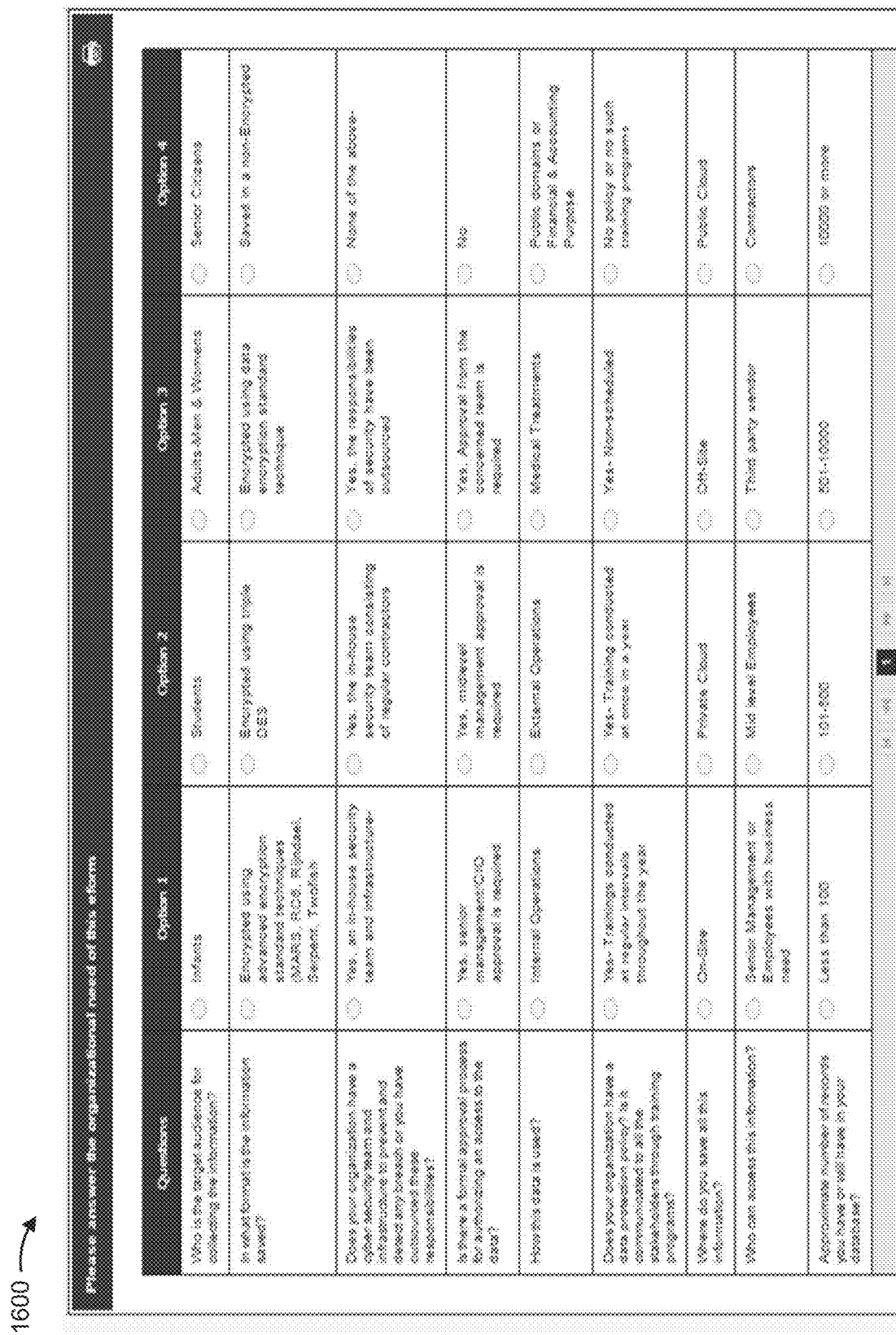

As a particular example, a user may login to access form analysis platform 220, such as via a user interface (e.g., as shown in FIG. 5), and may provide various form analysis information, such as industry profile and jurisdiction (e.g., as shown in FIG. 6), form field justifications (e.g., as shown in FIG. 13), data policies (e.g., as shown in FIG. 16), or the like. Additionally, or alternatively, form analysis platform 220 may use an automated technique to determine some or all of the form analysis information, such as web crawling, natural language processing, and/or another automated technique. In some implementations, form analysis platform 220 may use a combination of user input data and data obtained by an automated technique.

Figure 7:
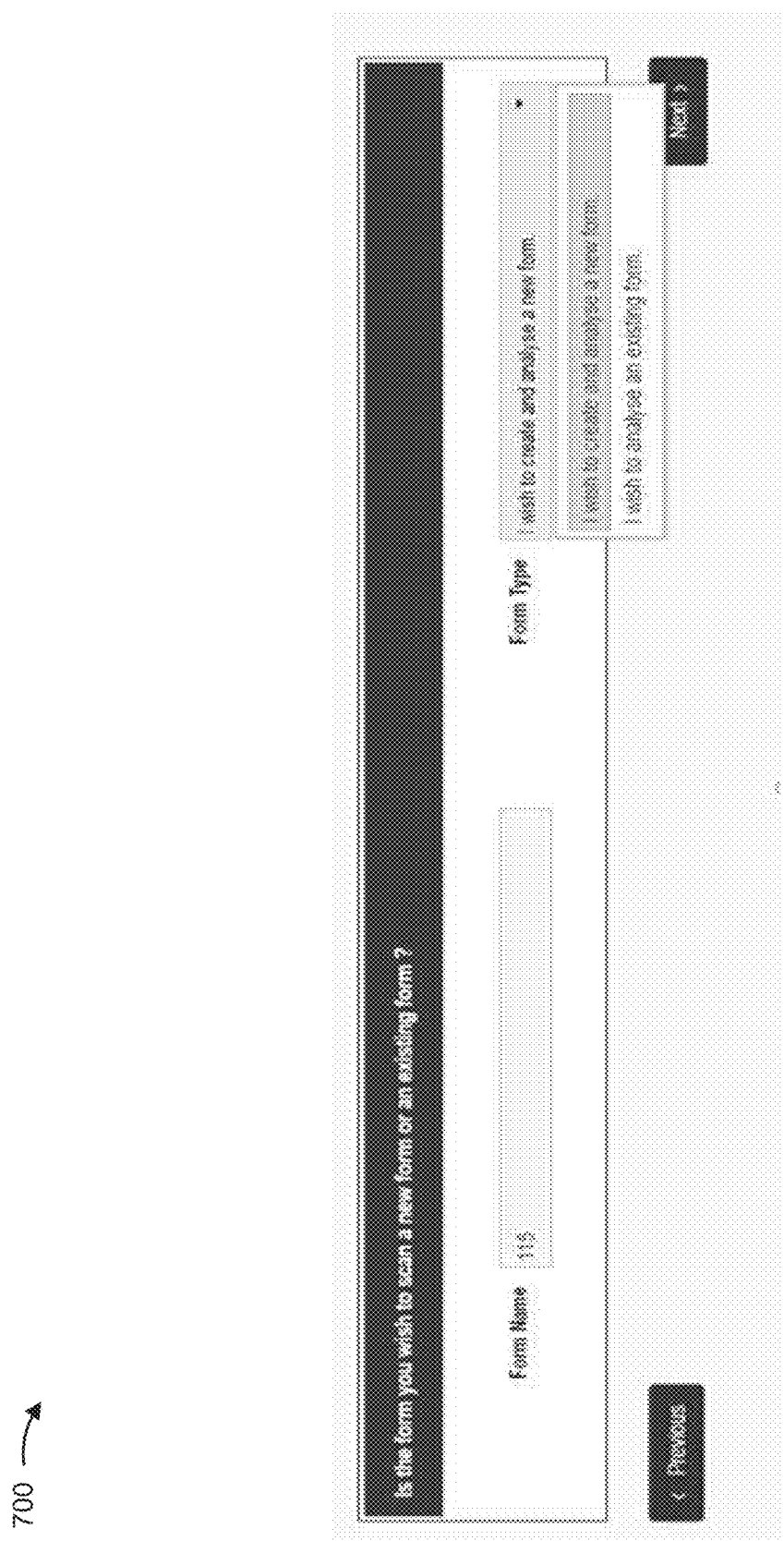

As further shown in FIG. 4, process 400 may include generating and/or analyzing a form based on the form analysis information (block 420). For example, form analysis platform 220 may generate and/or analyze a form based on the form analysis information. As indicated above, form analysis platform 220 may generate a new form to be analyzed or may analyze an existing form. In some implementations, a user may select whether to generate a new form or to analyze an existing for via a user interface (e.g., as shown in FIG. 7). Additionally, or alternatively, the user may indicate a location of a repository of forms, and form analysis platform 220 may analyze multiple forms in the repository in serial or in parallel.

Figure 8:
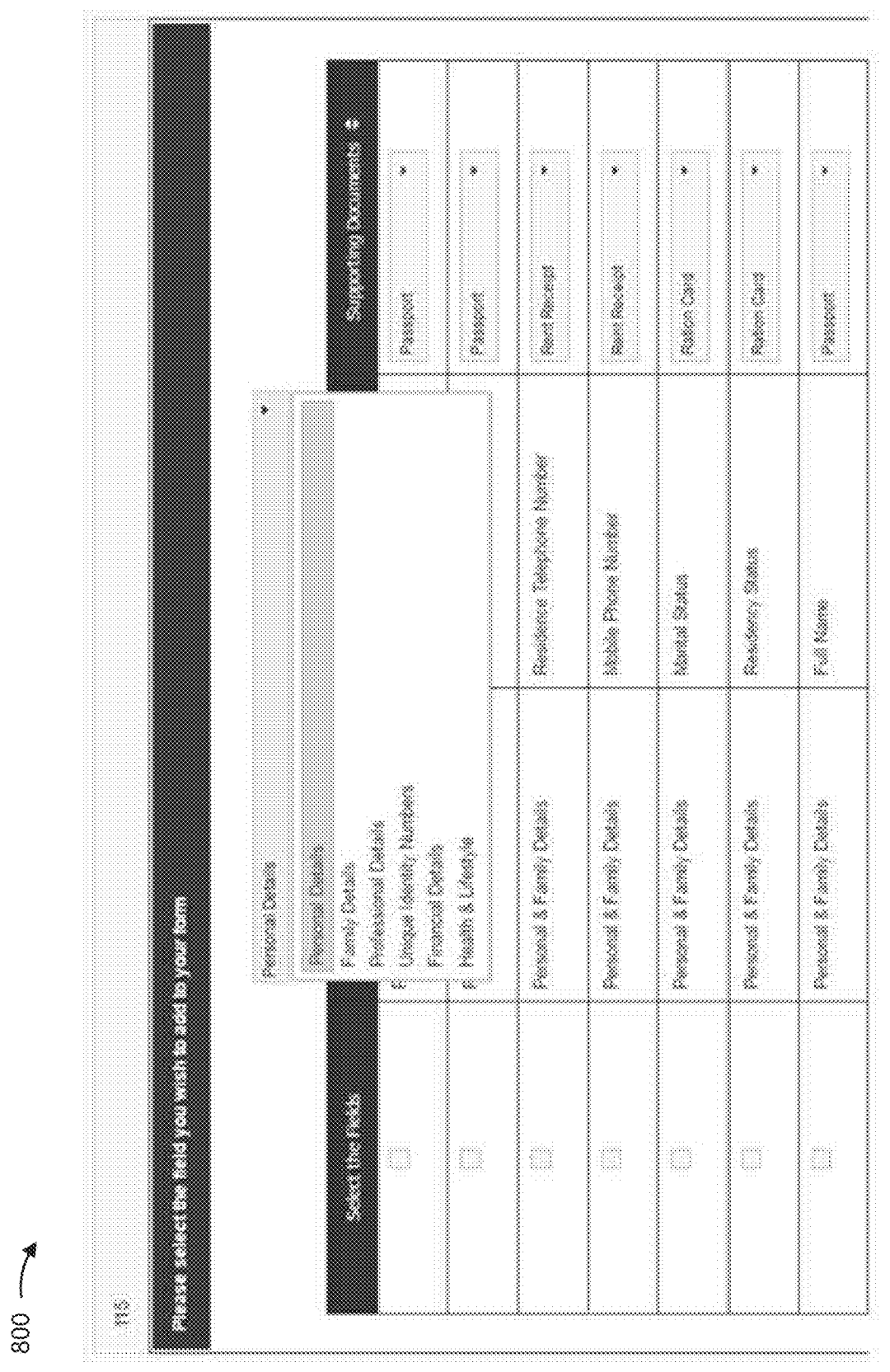
Figure 9:
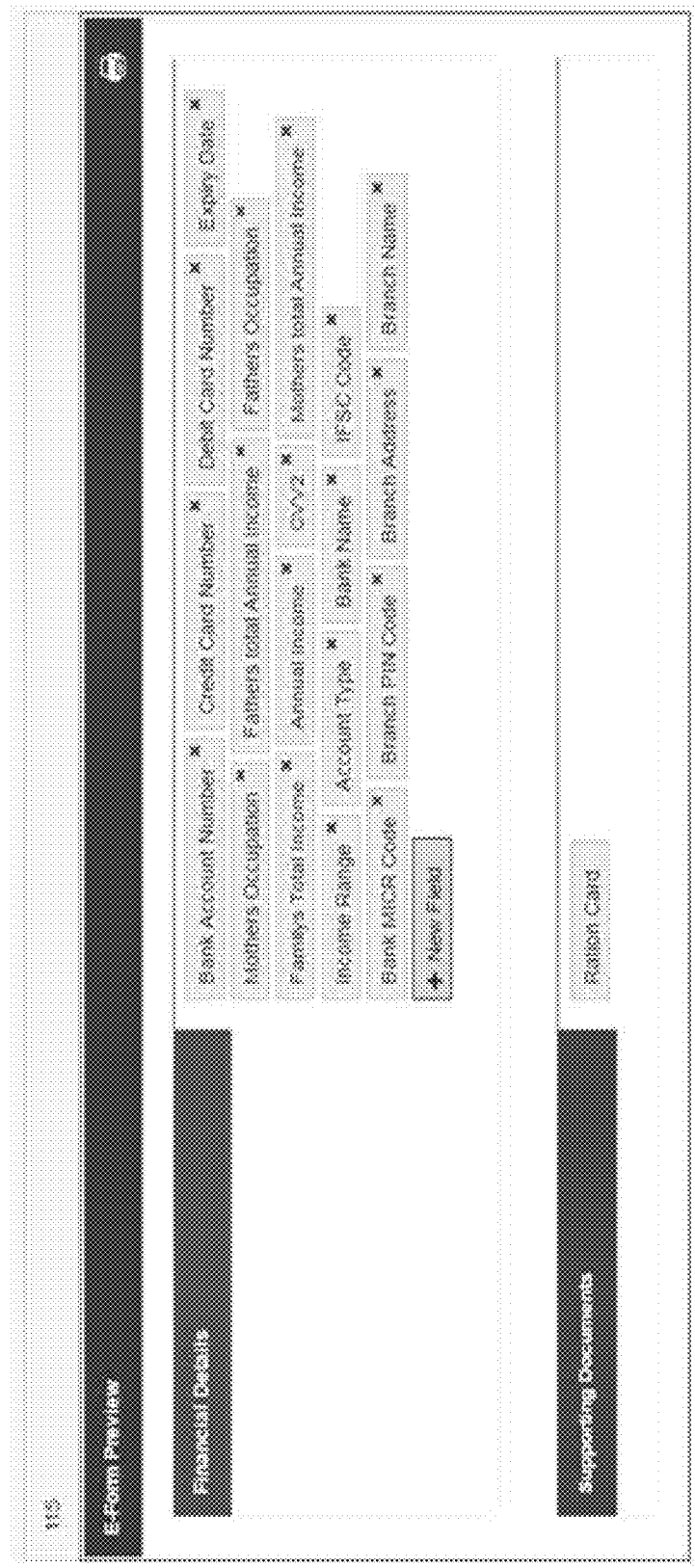

In some implementations, form analysis platform 220 may generate a new form based on receiving input from a user regarding fields to be included in the form and/or data to be gathered using the form (e.g., as shown in FIG. 8). In this case, a field may be associated with a particular type of information (e.g., "Mobile Phone Number" in FIG. 8), may be included in a field category (e.g., "Personal Details" or "Family Details" in FIG. 8), and/or may indicate supporting documentation used to support the provided information (e.g., "Passport" in FIG. 8). In some implementations, form analysis platform 220 may provide a summary of the fields to be included in a form when a user is done providing input (e.g., as shown in FIG. 9).

Additionally, or alternatively, form analysis platform 220 may generate a new form automatically. For example, form analysis platform 220 may predict various purposes of forms needed by the organization (e.g., using web crawling, natural language processing, artificial intelligence, etc.), and may provide a list of purposes or form types. In this case, the user may indicate a purpose of the form by selecting the purpose from the list, and form analysis platform 220 may predict the types of fields needed. Based on the prediction, the user may select fields that the user wants to include in the form. In this way, form analysis platform 220 provides objective and consistent generation of forms, and improves security by accurately identifying purposes that may be associated with existing knowledge about privacy regulations, concerns, techniques, or the like.

In some implementations, form analysis platform 220 may analyze an existing form by using field tags and/or natural language processing to determine a type of data being requested via the form. In some implementations (e.g., for new forms), form analysis platform 220 may determine the type of data using field tags and/or types of fields available to form analysis platform 220. Additionally, or alternatively (e.g., for existing forms), form analysis platform 220 may obtain the field tags by reading code (e.g., extensible markup language code and/or hypertext markup language code), and/or may determine fields using optical character recognition (OCR) and/or natural language processing. In some implementations, form analysis platform 220 may analyze a form based on fields included in the form and based on form analysis information, as described below.

As further shown in FIG. 4, process 400 may include generating one or more scores for the form based on analyzing the form (block 430). For example, form analysis platform 220 may generate one or more scores for the form based on analyzing the form.

In some implementations, form analysis platform 220 may store a data structure that indicates a score (e.g., a risk score) for a particular field type and a particular type of form analysis information that applies to the form. For example, form analysis platform 220 may determine an individual score per field and form analysis information type, and may combine all of the individual scores for all form analysis information types for the field to generate an overall score for the field (e.g., an average, a maximum, etc.). In some implementations, form analysis platform 220 may perform this operation for all fields to generate a score for the form.

Additionally, or alternatively, form analysis platform 220 may generate a score using a predictive model, such as by predicting an impact of a particular field type on a risk level for the organization (e.g., based on an industry profile, a government regulation, a form field justification, a data policy, etc.). Additionally, or alternatively, form analysis platform 220 may create a model to be used to generate and/or analyze a form for an organization based on one or more forms for related organizations (e.g., forms that have a related purpose, organizations that have similar industry profile information, jurisdictions, and/or geographic regions, etc.). In some implementations, form analysis platform 220 may obtain a form of a related organization from a repository and/or by crawling the web, and may analyze the form using natural language processing.

Additionally, or alternatively, form analysis platform 220 may generate a score using machine learning or artificial intelligence, such as by crawling the web for one or more articles relating to a data breach, a type of sensitive information associated with the data breach, an industry profile associated with organizations involved in the data breach, a government associated with the data breach, data policies of the organizations involved in the data breach, or the like, to generate or revise scores that represent a risk level of information obtained using a form.

In some implementations, form analysis platform 220 may generate a form privacy score that represents a level of privacy risk associated with the form based on an industry profile and/or government regulations associated with an organization for which the form is created or analyzed. Form analysis platform 220 may generate the form privacy score based on the fields in the form and based on the industry profile and/or government regulations. For example, form analysis platform 220 may use information stored in a data structure to determine a score for one or more fields included in the form, where a particular combination of field, industry profile information, and/or government regulation is associated with a score. Form analysis platform 220 may determine a form privacy score for the form by combining multiple scores for fields included in the form (e.g., an average score, a minimum score, a maximum score, etc.).

Figure 10:
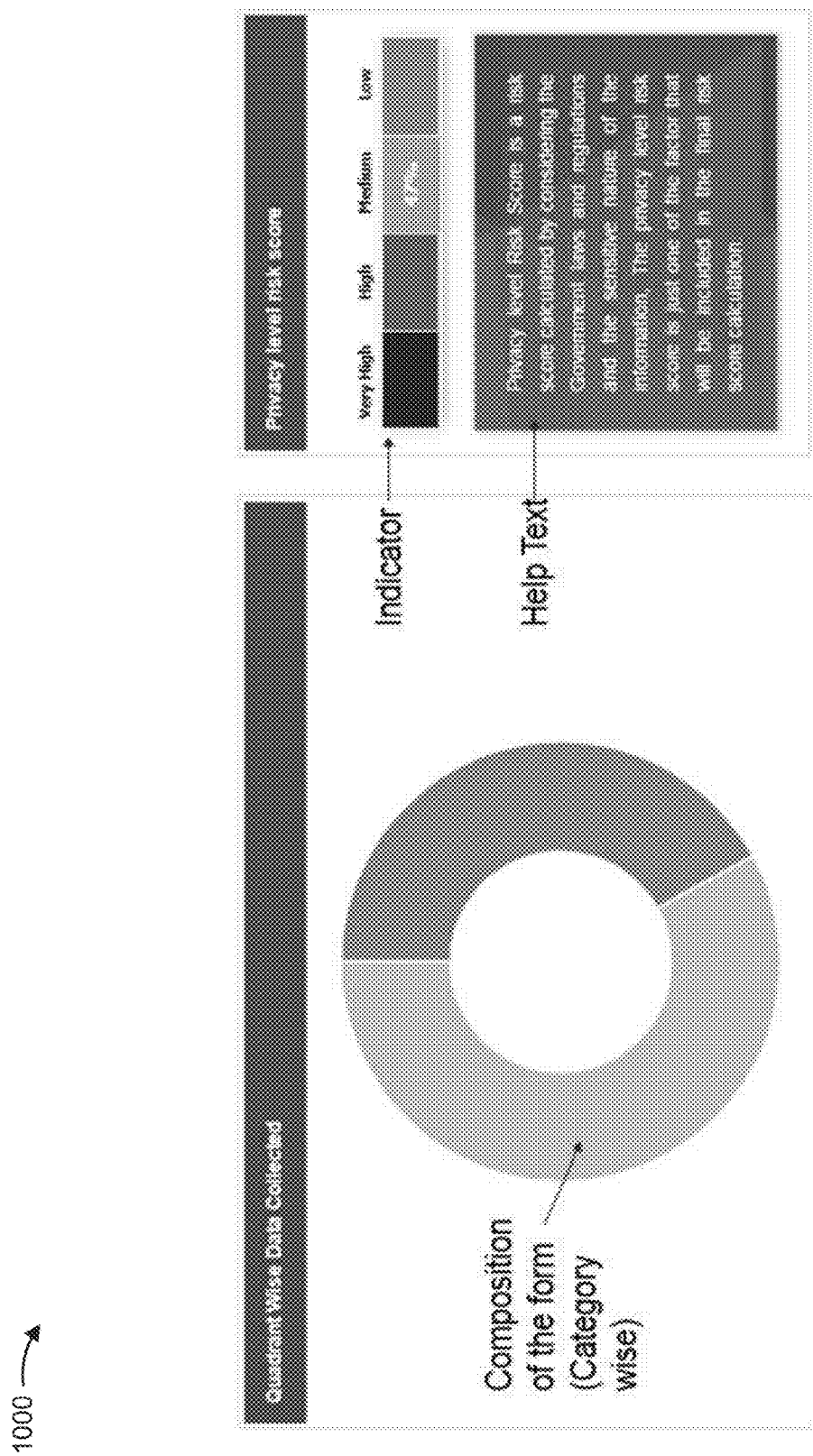
Figure 11:
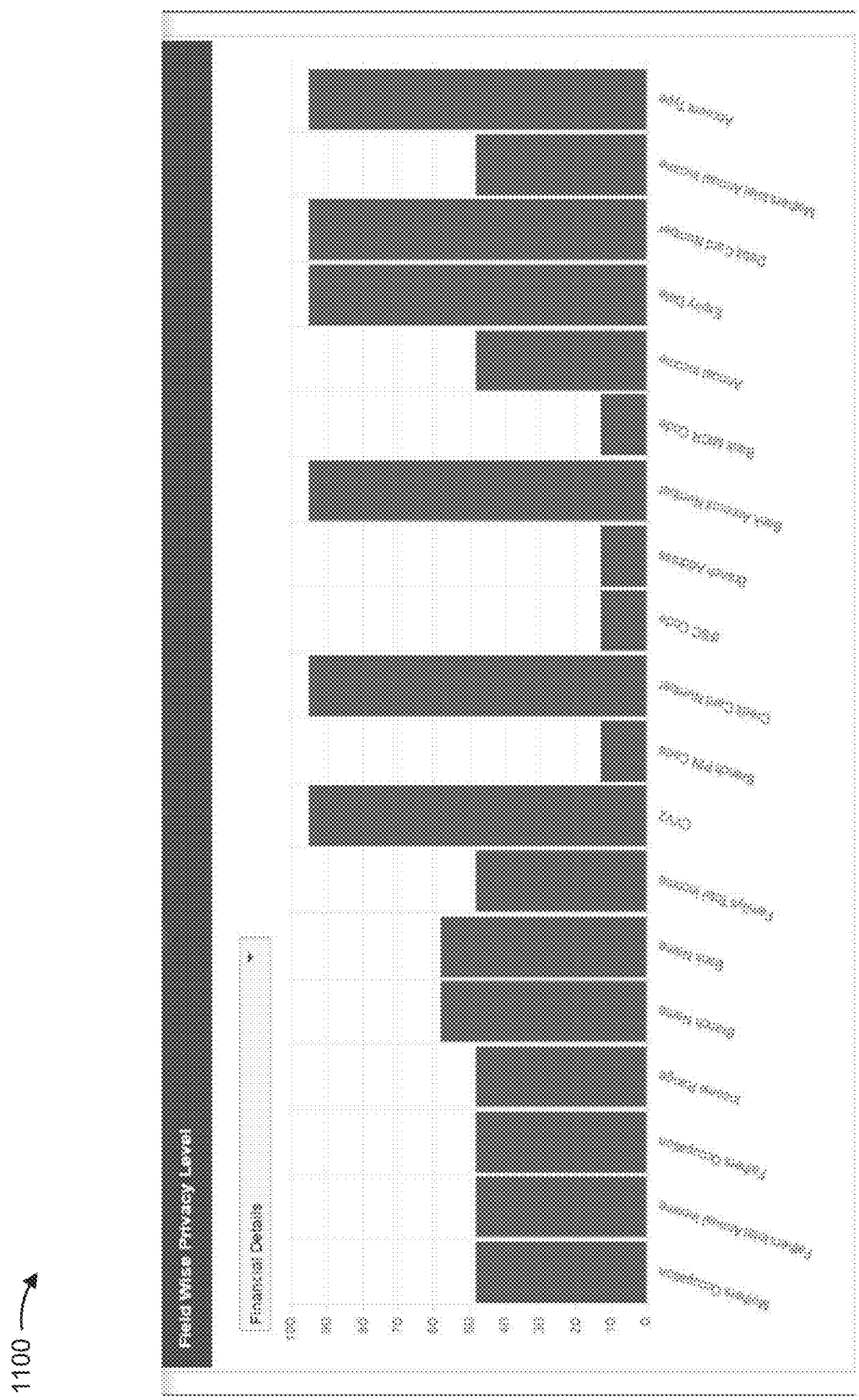
Figure 12:
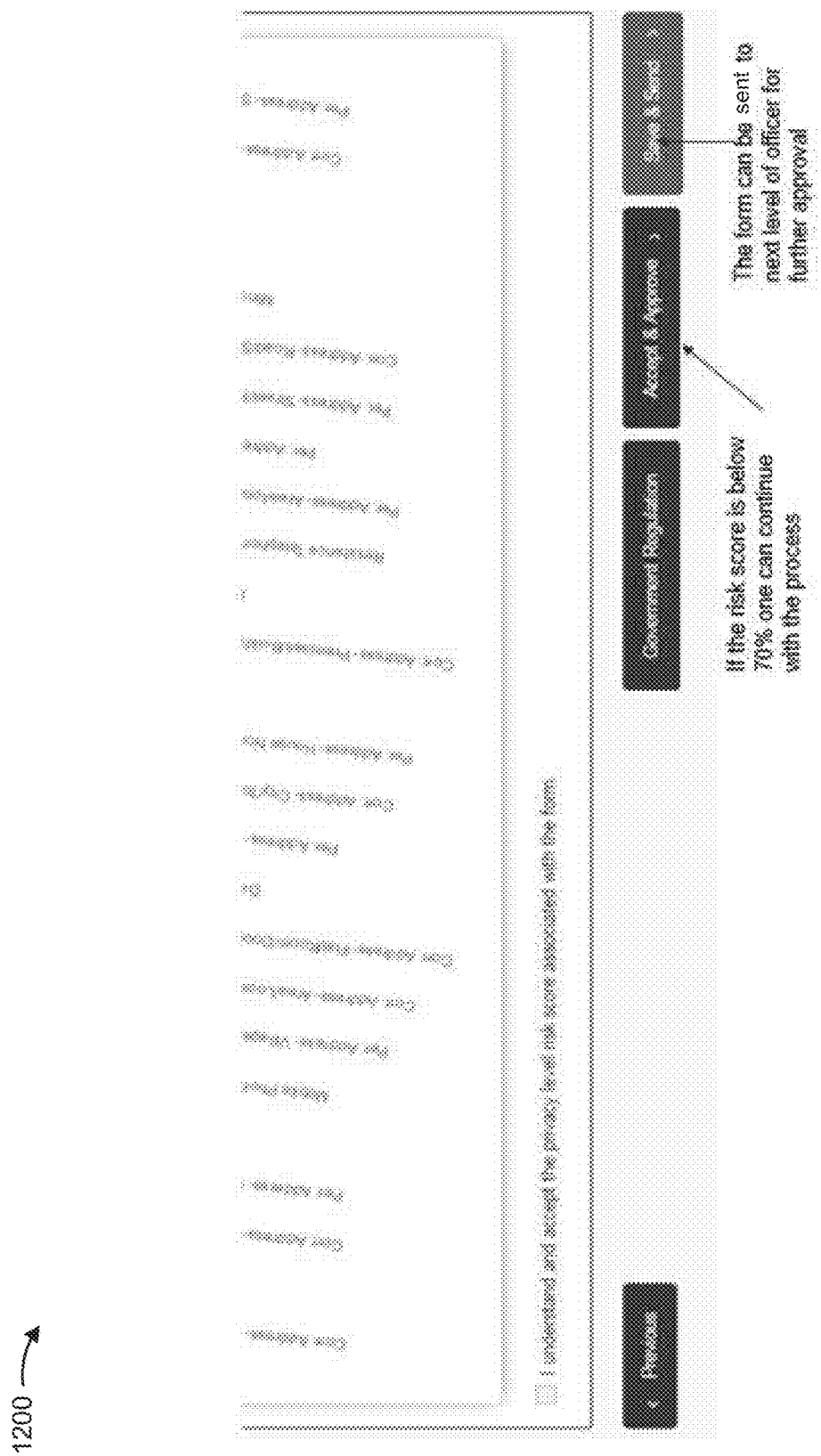

Additionally, or alternatively, form analysis platform 220 may generate the form privacy score using a predictive model, such as by predicting an impact of the form and/or one or more fields included in the form on a risk level for the organization (e.g., based on an industry profile, a government regulation, etc.). Additionally, or alternatively, form analysis platform 220 may generate the form privacy score using machine learning or artificial intelligence, such as by crawling the web for one or more articles relating to a data breach, a type of sensitive information associated with the data breach, an industry profile associated with organizations involved in the data breach, a government associated with the data breach, or the like, to generate or revise a form privacy score a level of privacy risk associated with the form (e.g., based on information to be collected using the form). Possible representations of the form privacy score are shown in FIGS. 10-12.

In some implementations, form analysis platform 220 may generate a form justification score that represents a level of risk associated with the form due to unneeded data to be potentially collected by an organization using the form. Form analysis platform 220 may generate the form justification score based on the fields and the form field justifications. For example, form analysis platform 220 may use information stored in a data structure to determine a score for one or more fields included in the form, where a particular combination of field and form field justification is associated with a score. Form analysis platform 220 may determine a form justification score for the form by combining multiple scores for fields included in the form (e.g., an average score, a minimum score, a maximum score, etc.).

Figure 14:
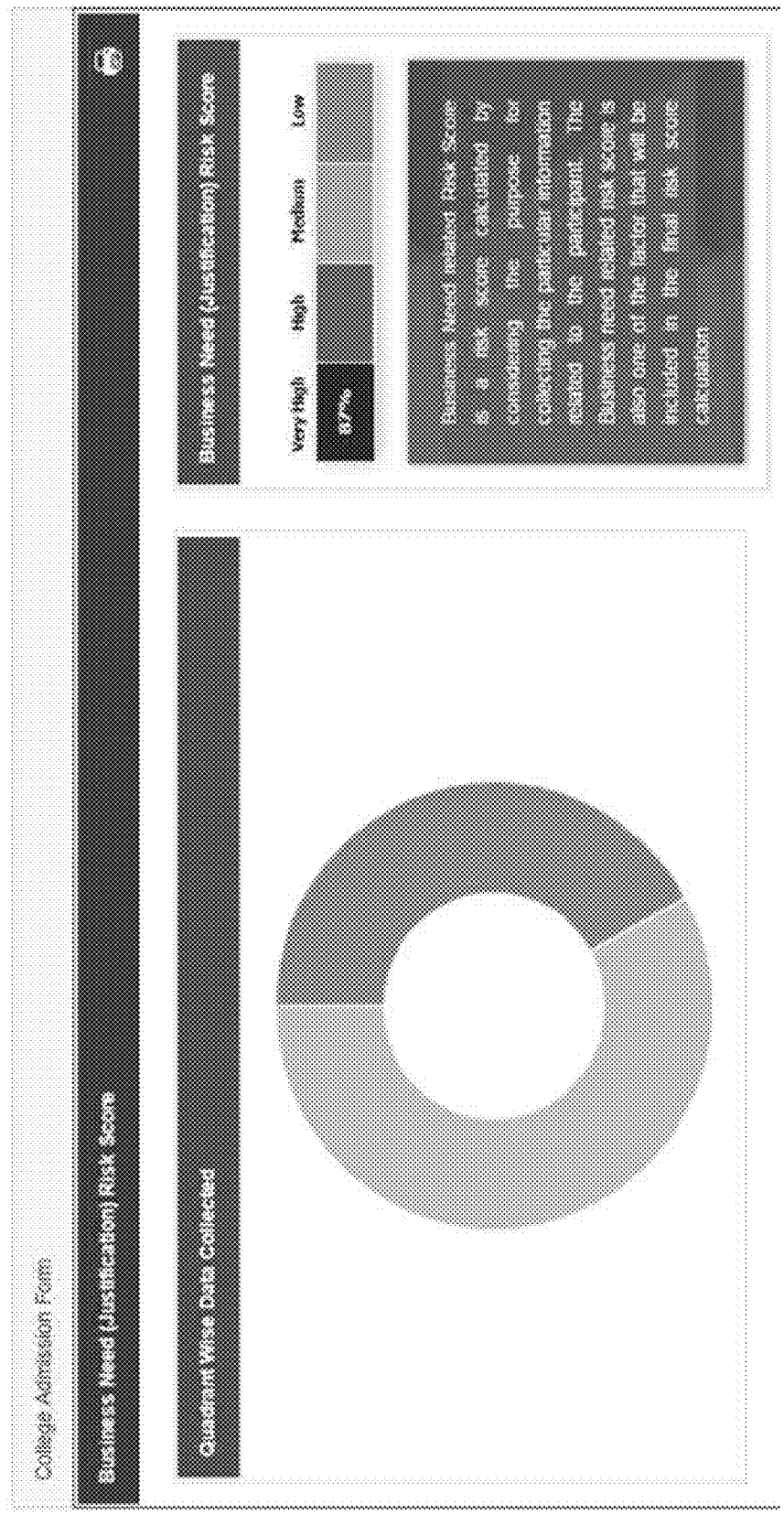
Figure 15:
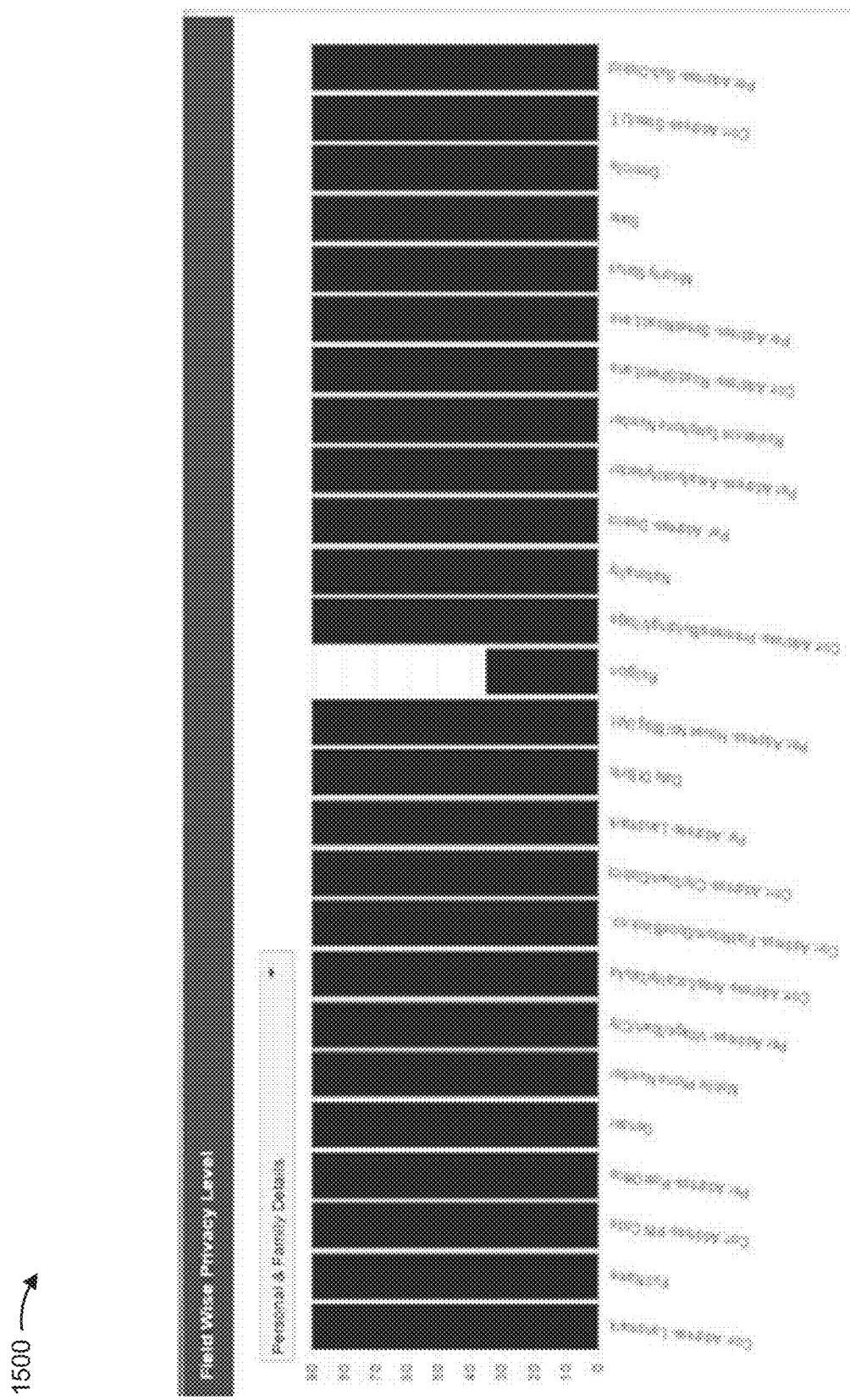

Additionally, or alternatively, form analysis platform 220 may generate the form justification score using a predictive model, such as by predicting how relevant the form and/or one or more fields included in the form are to the organization (e.g., based on an industry profile, a government regulation, other forms associated with similar organizations in a same industry and/or jurisdiction, etc.). Additionally, or alternatively, form analysis platform 220 may generate the form justification score using machine learning or artificial intelligence, such as by crawling the web for one or more forms associated with similar organizations, to generate or revise a form justification score that represents a level of risk associated with the form due to unneeded or potentially sensitive data to be potentially collected by an organization using the form. Possible representations of the form justification score are shown in FIGS. 14-15.

In some implementations, form analysis platform 220 may generate an organizational privacy score that represents a level of risk associated with an organization's data policies. Form analysis platform 220 may generate the organizational privacy score based on the fields and/or based on data policies. For example, form analysis platform 220 may use information stored in a data structure to determine a score for one or more fields included in the form, where a particular combination of field and data policy is associated with a score. Form analysis platform 220 may determine an organizational privacy score for the form by combining multiple scores for fields included in the form (e.g., an average score, a minimum score, a maximum score, etc.).

Figure 17:
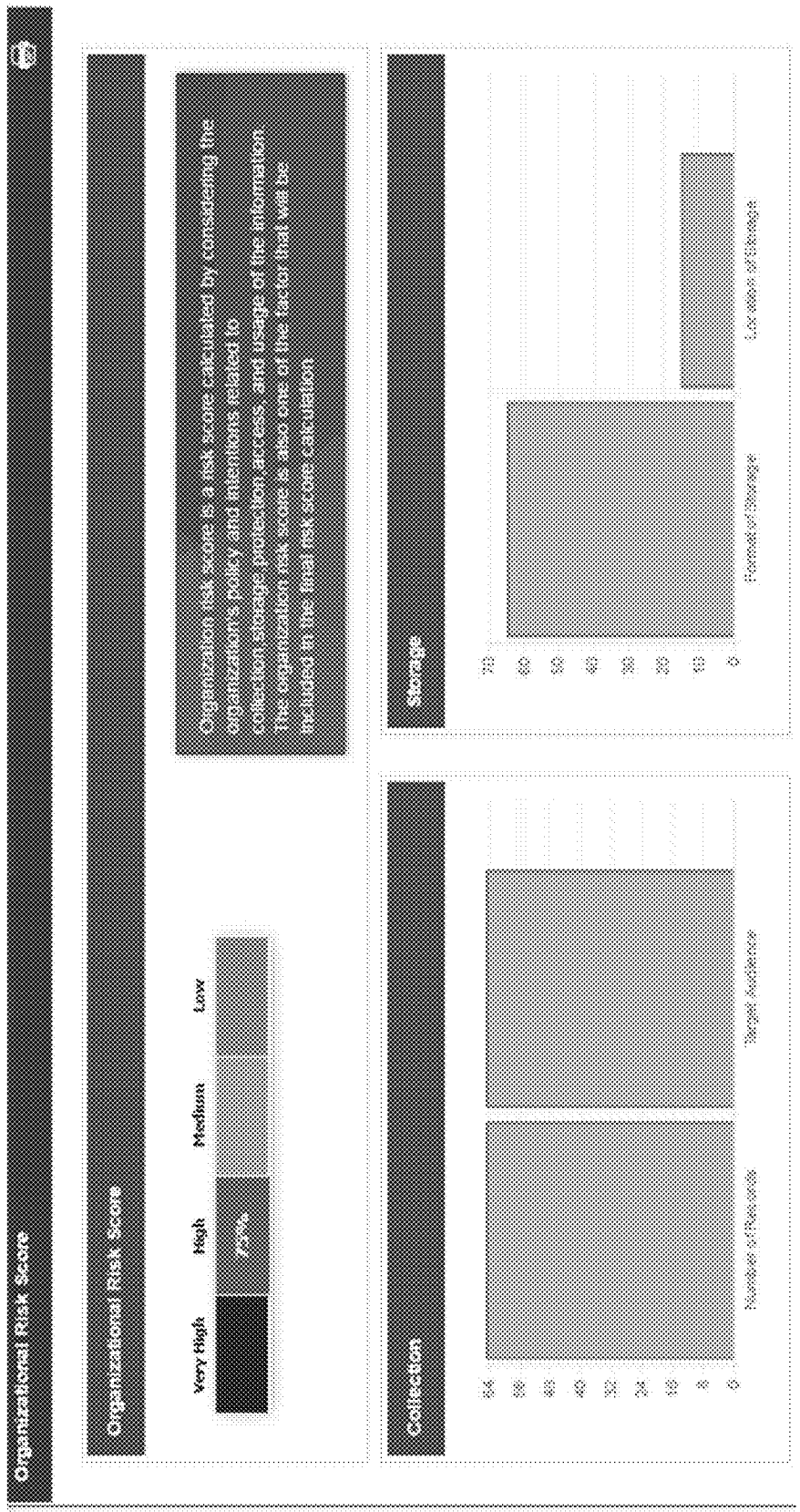
Figure 18:
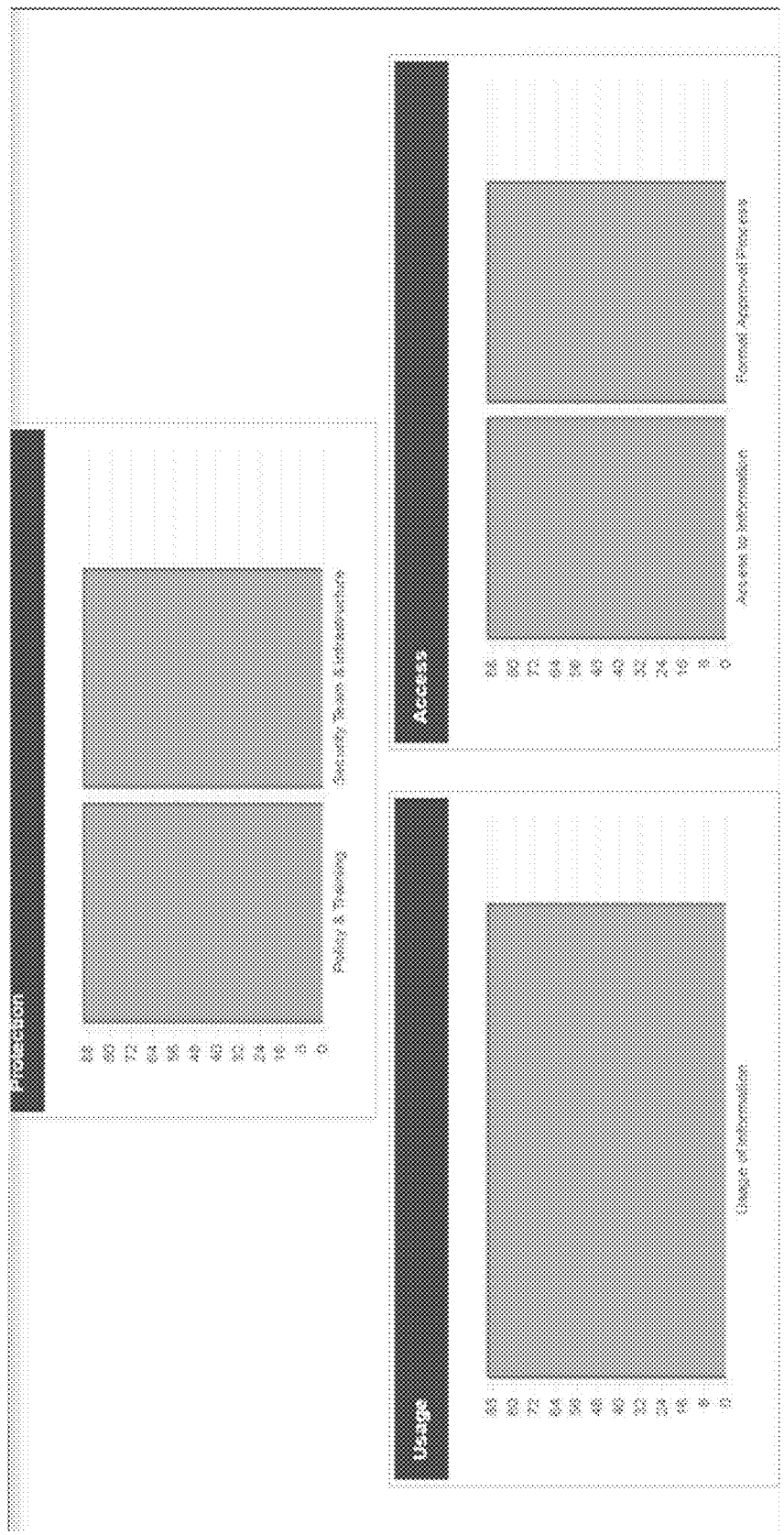

Additionally, or alternatively, form analysis platform 220 may generate the organizational privacy score using a predictive model, such as by predicting a likelihood of the form and/or one or more fields included in the form being subject to a data breach (e.g., based on a data policy, an industry profile, etc.). Additionally, or alternatively, form analysis platform 220 may generate the organizational privacy score using machine learning or artificial intelligence, such as by crawling the web for one or more articles associated with data breaches and/or data policies (e.g., to determine a type of information subject to the data breach, to determine an industry profile associated with the data breach, etc.) to generate or revise an organizational privacy score that represents a level of risk associated with an organization's data policies. Possible representations of the organizational privacy score are shown in FIGS. 17-18.

Figure 19:
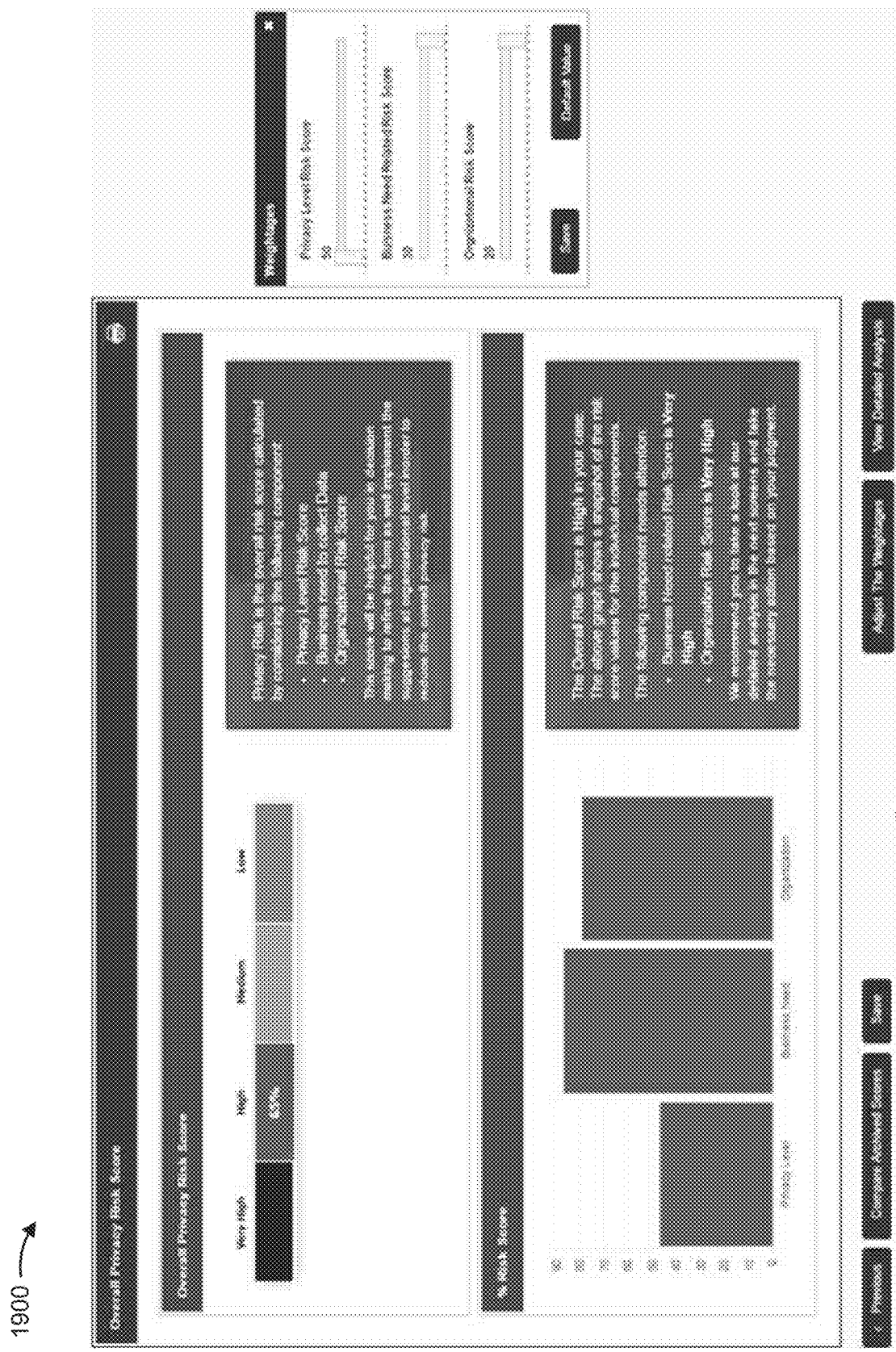

In some implementations, form analysis platform 220 may generate an overall privacy score, which may be calculated based on a combination of two or more of the form privacy score, the form justification score, and/or the organizational privacy score. In some implementations, form analysis platform 220 may calculate the overall privacy score as a weighted combination of the form privacy score, the form justification score, and/or the organizational privacy score. Additionally, or alternatively, form analysis platform 220 may calculate the overall privacy score by applying a predictive model (e.g., to predict a relative level of risk associated with the different scores), machine learning, artificial intelligence, and/or web crawling, as described elsewhere herein. Possible representations of the overall privacy score are shown in FIG. 19.

Figure 22:
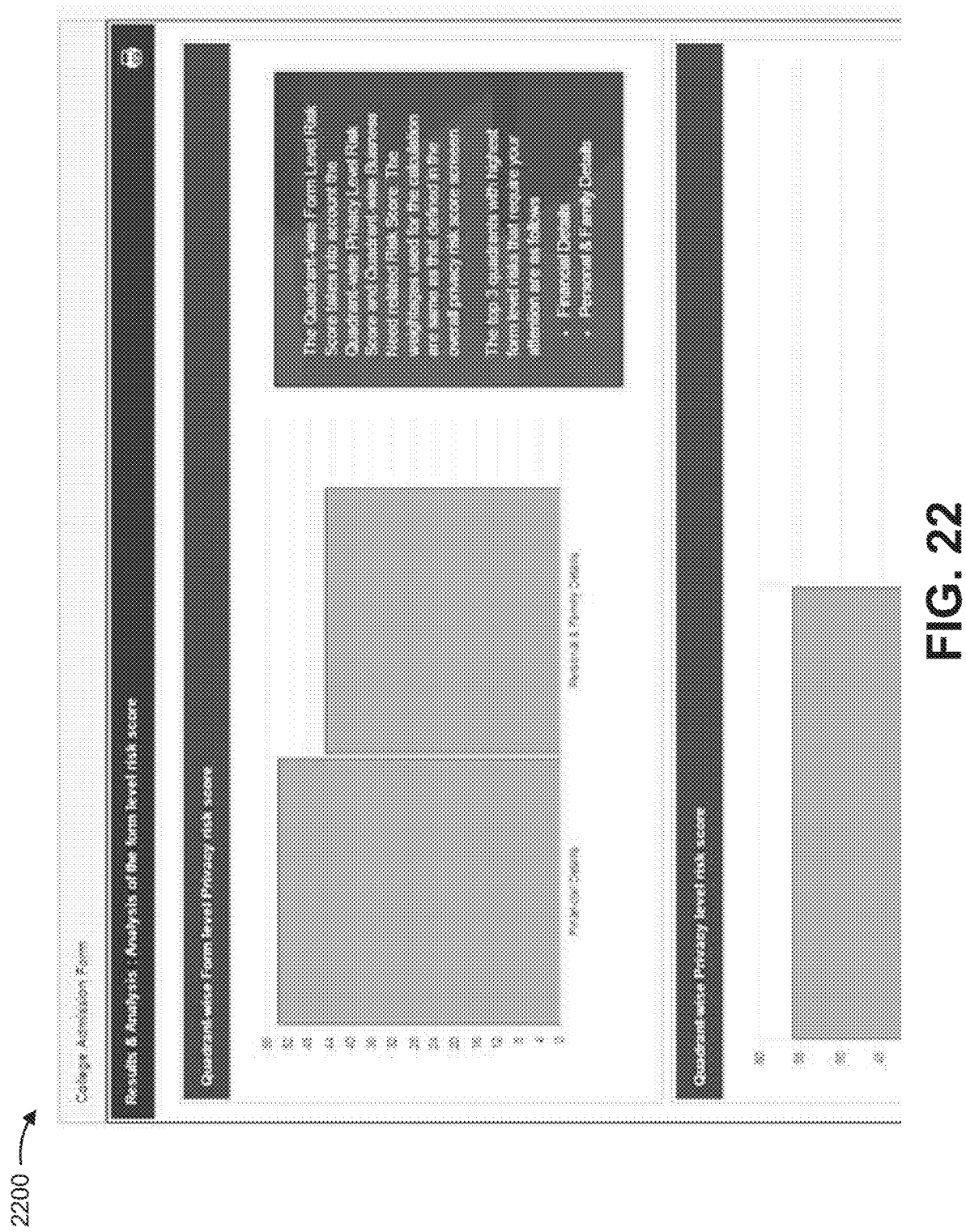

In some implementations, form analysis platform 220 may generate a combined form score, which may be calculated based on the form privacy score and the form justification score. In some implementations, form analysis platform 220 may calculate the combined form score as a weighted combination of the form privacy score and the form justification score. Additionally, or alternatively, form analysis platform 220 may calculate the combined form score by applying a predictive model (e.g., to predict a relative level of risk associated with the different scores), machine learning, artificial intelligence, and/or web crawling, as described elsewhere herein. Possible representations of the combined form score are shown in FIG. 22.

In some implementations, form analysis platform 220 may generate a field combination score that represents a level of risk associated with one or more combinations of fields included in a form. For example, some combinations of field information may create higher risks, such as a social security number and a date of birth, and form analysis platform 220 may calculate the field combination score based on a combination of fields included in a single form. In some implementations, form analysis platform 220 may use information stored in a data structure to determine a score for a combination of two or more fields included in the form, where a particular combination of fields is associated with a score. Form analysis platform 220 may determine a field combination score for the form by combining multiple scores for multiple combinations of fields included in the form (e.g., an average score, a minimum score, a maximum score, etc.).

Figure 23:
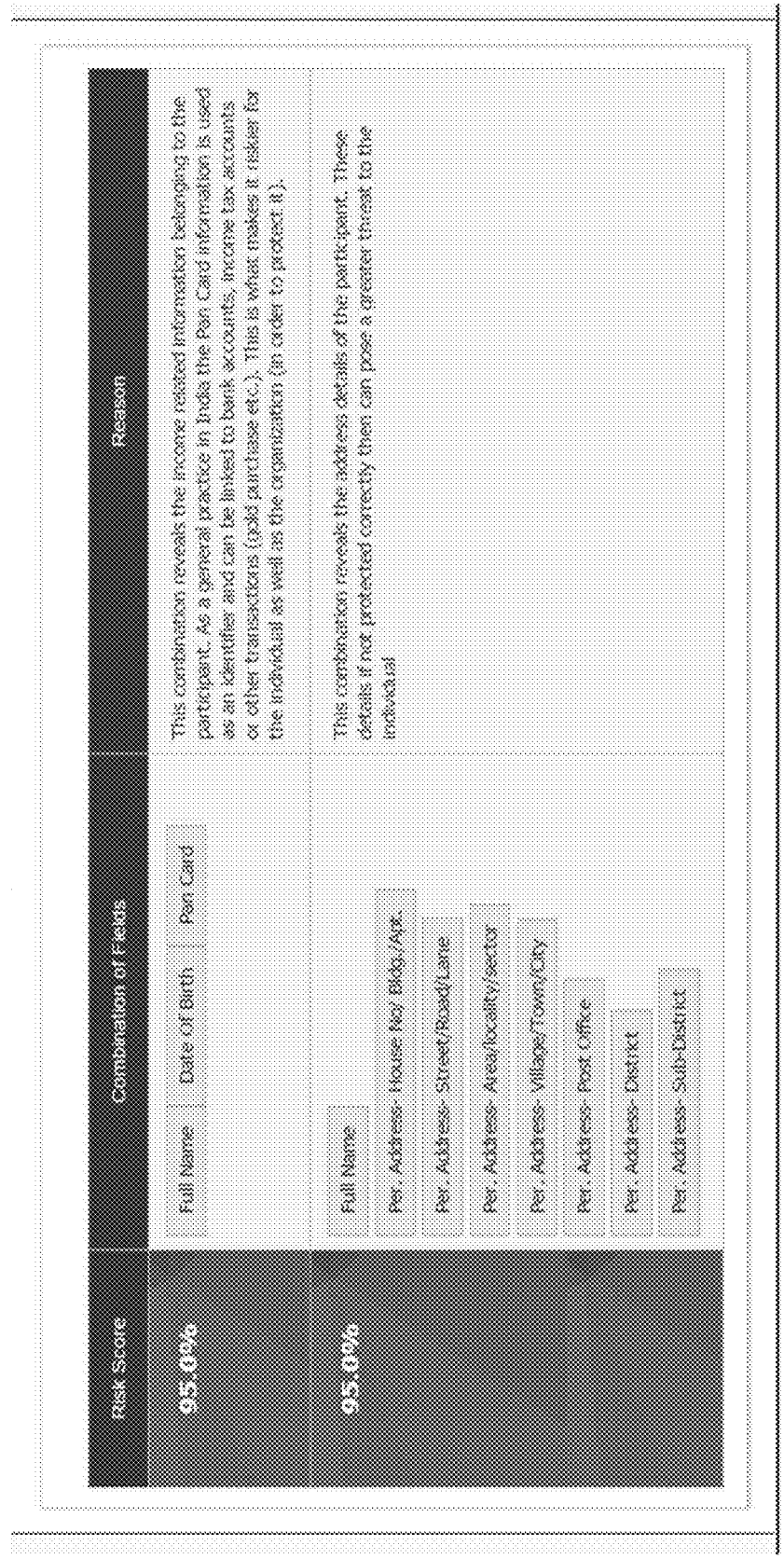

Additionally, or alternatively, form analysis platform 220 may generate the field combination score using a predictive model, such as by predicting a level of risk associated with a particular combination of fields (e.g., based on an industry profile, a government regulation, other forms associated with similar organizations in a same industry and/or jurisdiction, etc.). Additionally, or alternatively, form analysis platform 220 may generate the field combination score using machine learning or artificial intelligence, such as by crawling the web for one or more forms associated with similar organizations, to determine types of information exposed during data breaches, or the like, to generate or revise a field combination score that represents a level of risk associated with one or more combinations of fields included in a form. Possible representations of the field combination score are shown in FIG. 23.

Figure 24:
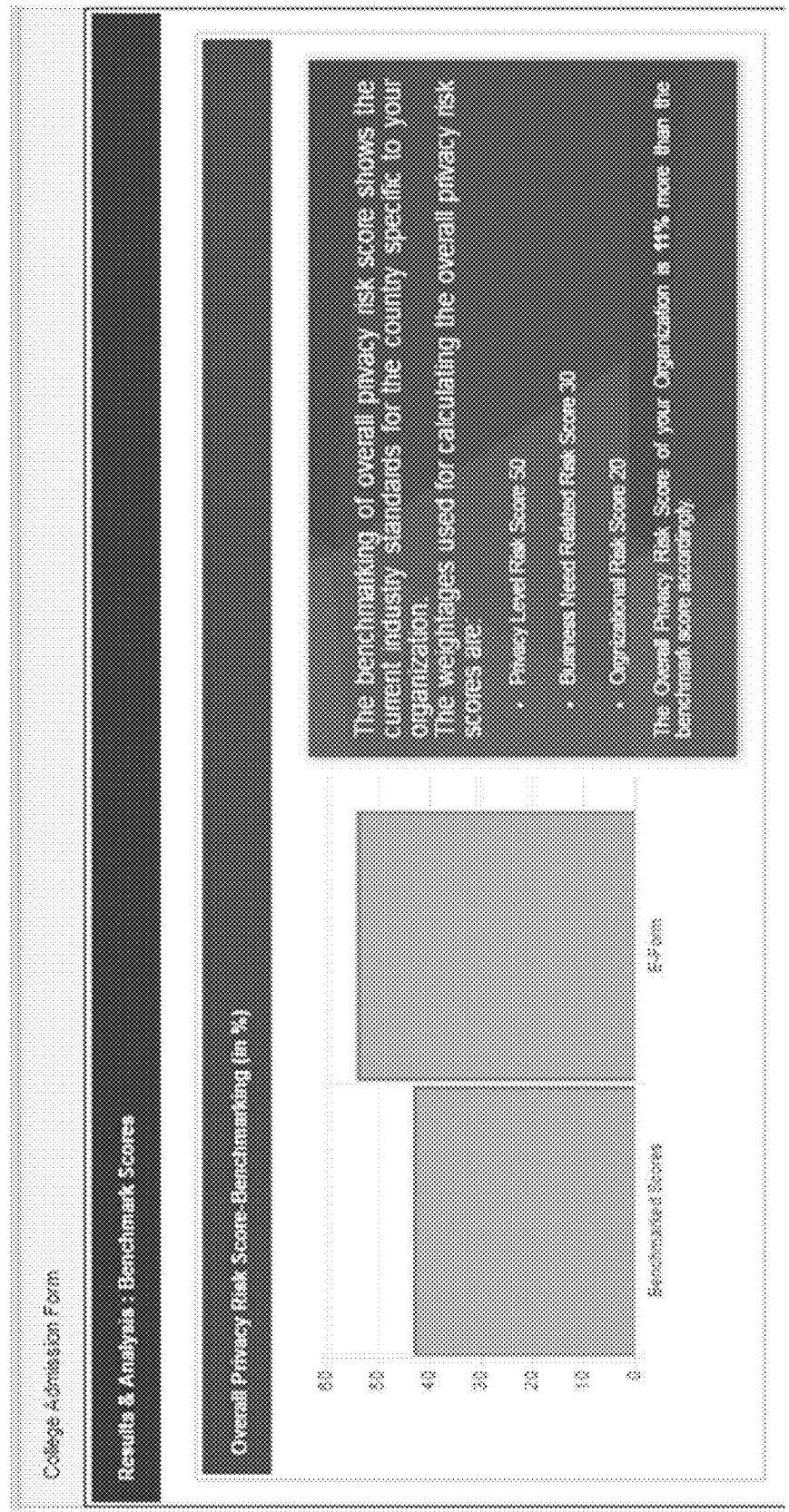
Figure 25:
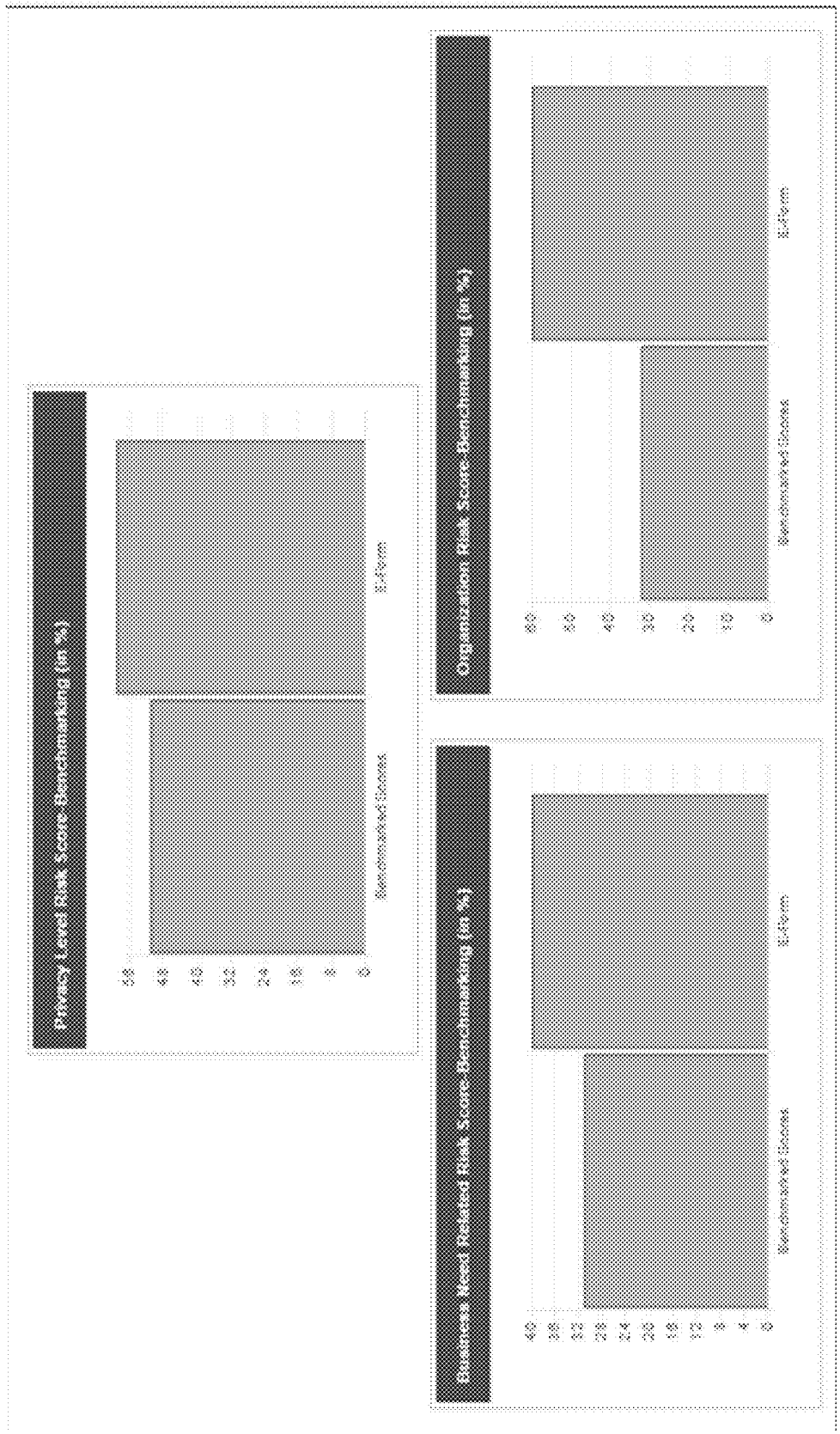

In some implementations, form analysis platform 220 may generate a benchmarking score, which may represent a comparison of a score of one organization to a score of another organization, or a comparison of a score of an organization to the organization's industry as a whole (e.g., using averages). In some implementations, form analysis platform 220 may compare a form privacy score for a form of an organization to form privacy scores for similar forms (e.g., determined to be similar based on a purpose of the form) for similar organizations (e.g., determined to be similar based on an industry profile, a jurisdiction, a geographic location, a data policy, or the like). Similarly, form analysis platform 220 may compare a combined form privacy score for multiple forms of an organization to a combined form privacy score of multiple similar organizations and/or for an industry as a whole. Form analysis platform 220 may compare form justification scores, organizational privacy scores, overall privacy scores, combined form scores, field combination scores, or the like in a similar manner. Possible representations of the benchmarking score are shown in FIGS. 24-25.

Figure 26:
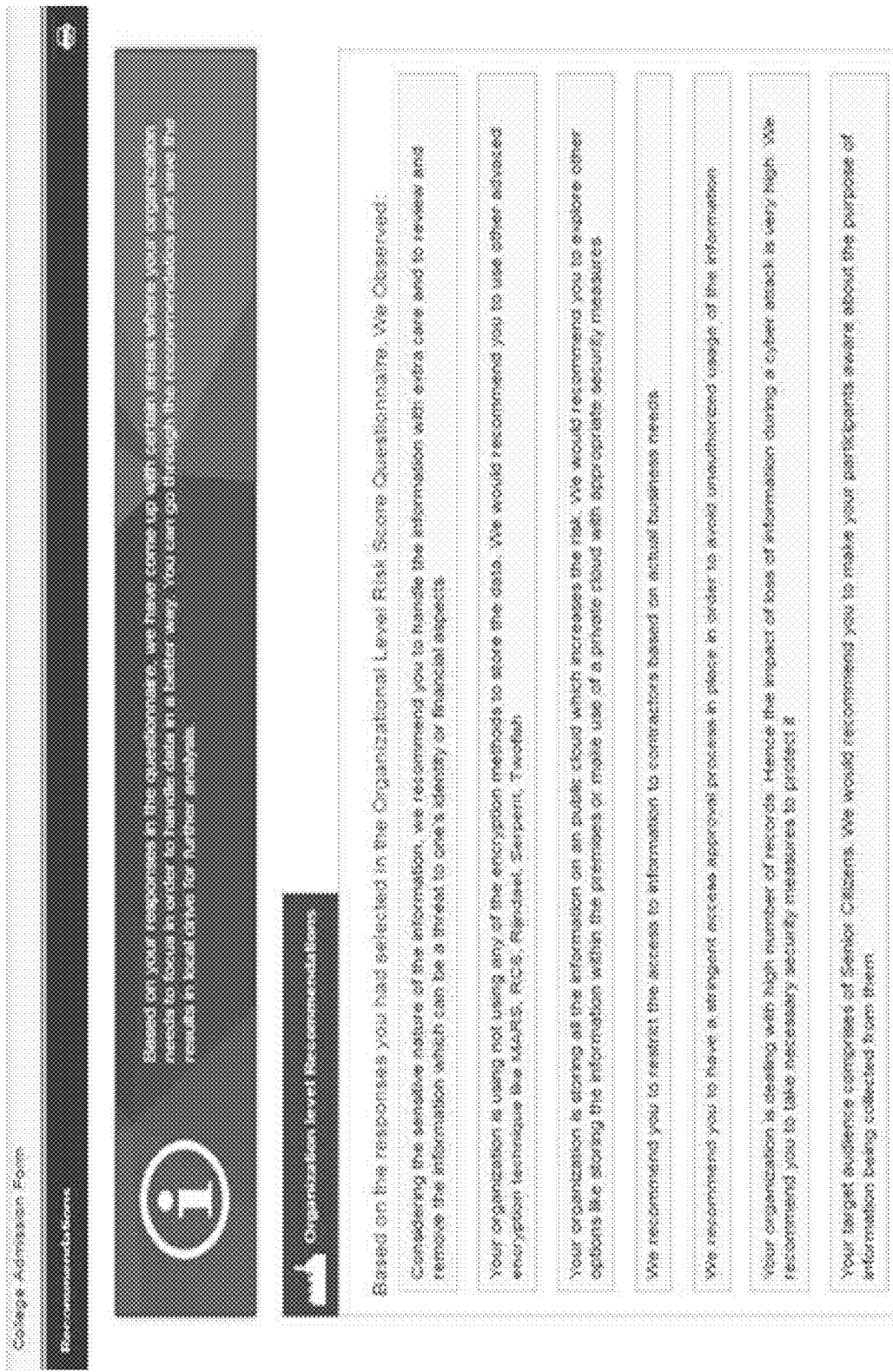
Figure 27:

As further shown in FIG. 4, process 400 may include providing one or more recommendations for the form based on the one or more scores (block 440). For example, form analysis platform 220 may provide one or more recommendations for the form based on the one or more scores. Example recommendations are shown in FIGS. 26-27.

As an example, form analysis platform 220 may provide a recommendation to use a particular form for a particular purpose. In this case, form analysis platform 220 may provide different combinations of scores and may provide an indication of how well the combination achieves the particular purpose. Additionally, or alternatively, form analysis platform 220 may provide an indication of one or more of the above scores.

Additionally, or alternatively, form analysis platform 220 may provide a recommendation to add a particular field (e.g., to better achieve a particular purpose). As yet another example, form analysis platform 220 may provide a recommendation to remove a field (e.g., a field that has a high risk score, a field that has a high risk score in combination with another field included in the form, etc.). As still another example, form analysis platform 220 may provide a recommendation to replace a first field with a second field (e.g., a less risky field that achieves a same purpose). Additional examples are shown in FIGS. 26-27.

As further shown in FIG. 4, process 400 may include performing one or more automated actions based on the one or more scores (block 450). For example, form analysis platform 220 may perform one or more automated actions based on the one or more scores.

Figure 20:
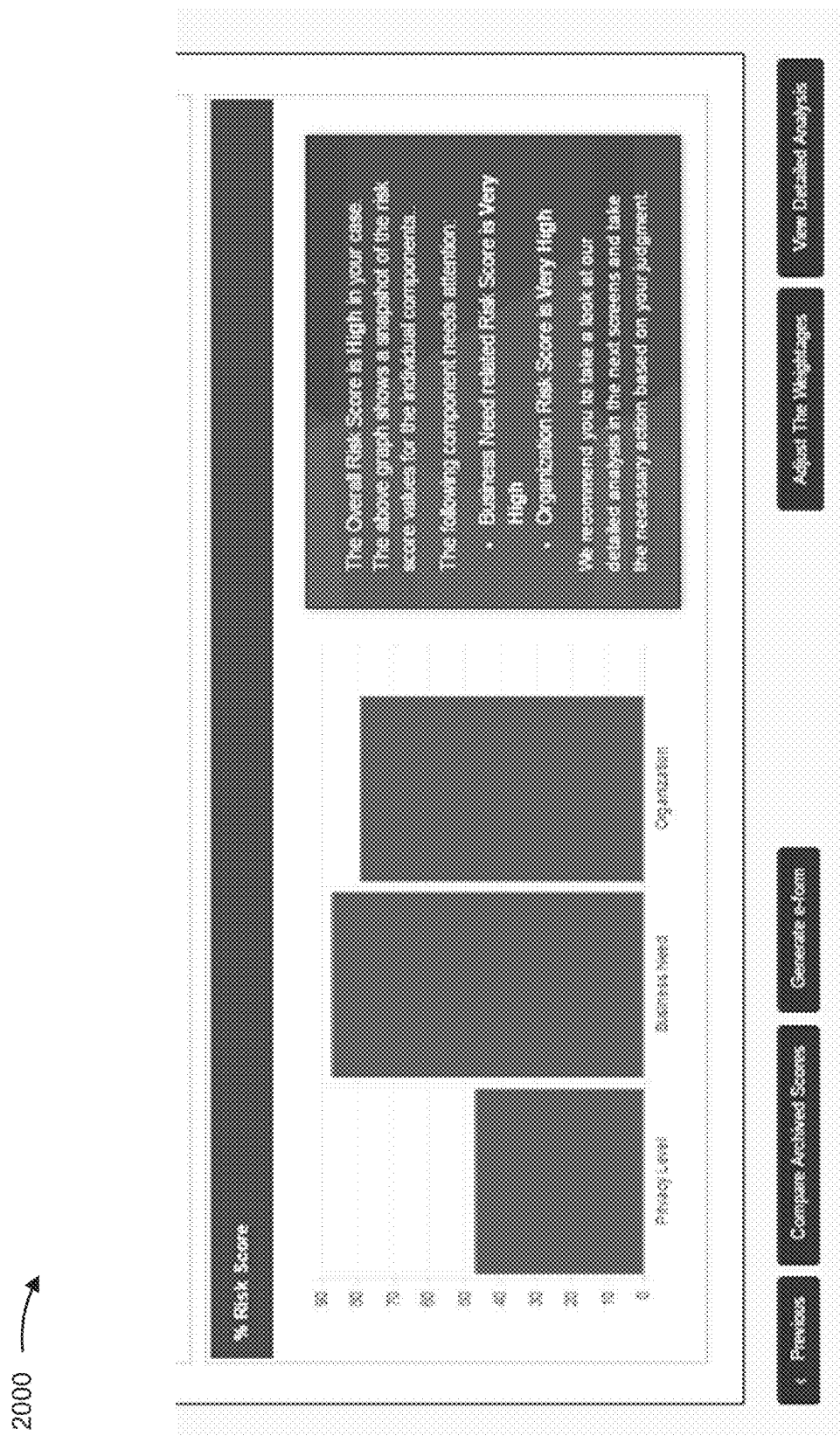

In some implementations, form analysis platform 220 may automatically generate a form. For example, form analysis platform 220 may automatically generate a form based on a request from a user via a user interface (e.g., as shown in FIG. 20). In some implementations, form analysis platform 220 may automatically generate a form, either with or without user input, if one or more scores satisfy a threshold (e.g., the overall score or combined form score indicates a low risk). In some implementations, a user may provide requirements, such as by indicating a purpose and an acceptable score (e.g., a threshold), and form analysis platform 220 may generate and/or obtain a form to satisfy the requirements (e.g., using web crawling, using database analysis, etc.).

Figure 21:
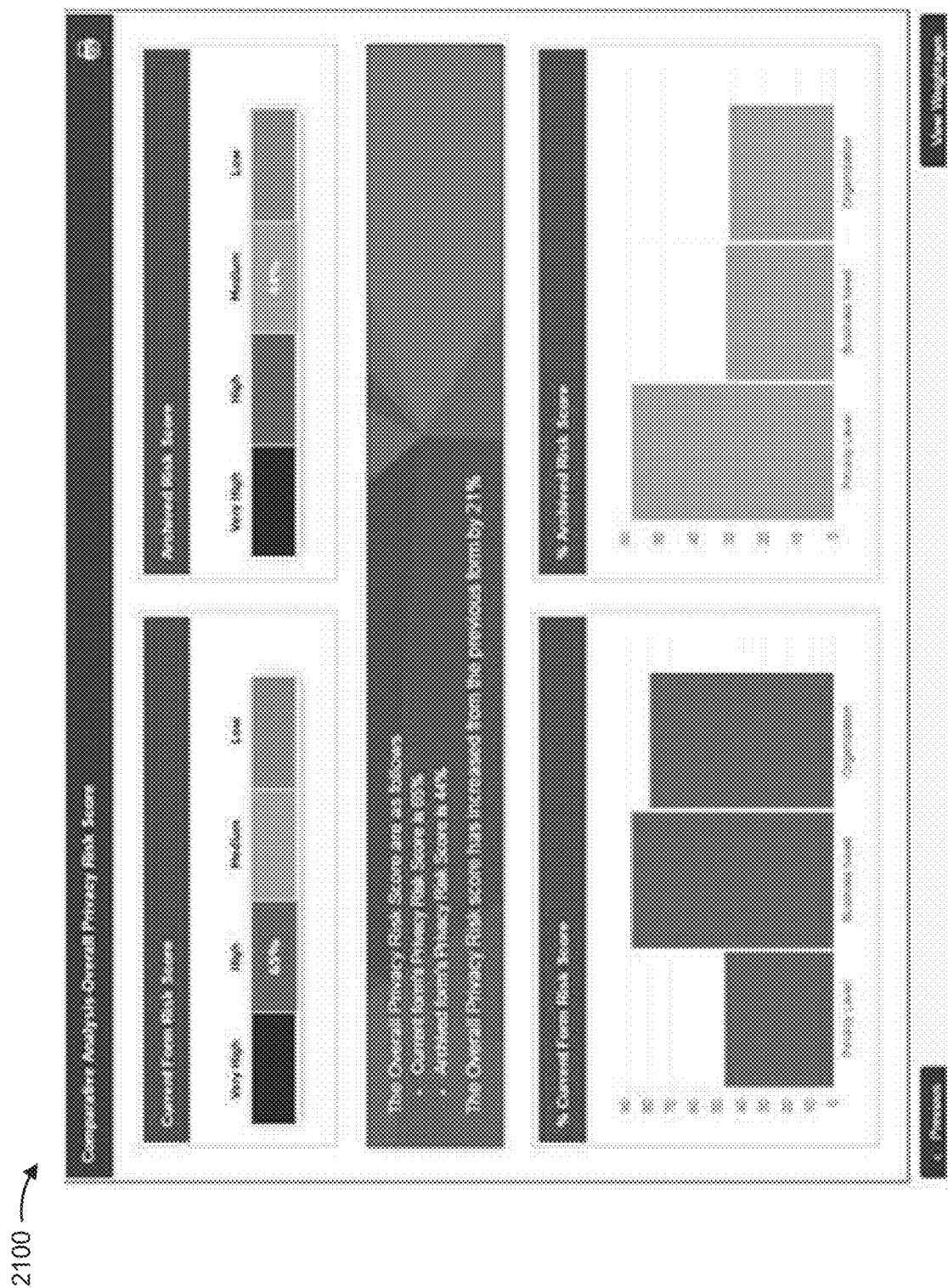

In some implementations, form analysis platform 220 may compare forms and/or scores for forms, and may select a form that best satisfies a combination of requirements (e.g., purpose and acceptable score). In this case, the forms may be created by a same organization for a same or similar purpose, or may be generated by other users of form analysis platform 220, or may be obtained from other sources (e.g., by web crawling). In some implementations, form analysis platform 220 may use any combination of the above forms, may extract fields, and may try different combinations to determine which combination best satisfies the requirements. In this case, form analysis platform 220 may generate the form or combination of forms that best satisfies the requirements. An example of comparison of scores is shown in FIG. 21.

In some implementations, form analysis platform 220 may automatically add, remove, or replace fields on forms. For example, form analysis platform 220 may crawl a website of an organization and automatically update web forms to obtain a lower risk score. As another example, a user may upload and/or input electronic forms, and form analysis platform 220 may update the electronic forms. In this case, for example, form analysis platform 220 may automatically add a field that helps to better achieve a purpose, may automatically remove a field with a score that satisfies a threshold (e.g., a high risk score; or a combination of a high risk score and a low purpose score), or may automatically replace a field with another field that achieves a same purpose with less risk.

In some implementations, form analysis platform 220 may use artificial intelligence, machine learning, and/or natural language processing to analyze form inputs (e.g., the inputs that a user inputs into a form field) to learn and assign risk scores to fields, to determine fields that result in duplicative input, or the like. In this case, form analysis platform 220 may update forms based on the learned information. Additionally, or alternatively, form analysis platform 220 may use the learned information to update the scores stored in the data structure and used to analyze existing or future forms.

In some implementations, form analysis platform 220 may scan the web for news regarding data breaches, data privacy, etc., and may automatically adjust stored risk scores based on the obtained news. For example, form analysis platform 220 may increase scores if there has been a recent data breach. As another example, form analysis platform 220 may increase scores for a particular industry based on a news article highlighting the dangers of data breaches in that industry. In some implementations, form analysis platform 220 may scan comments of articles to determine one or more user reactions, and may use this information to update scores. In some implementations, form analysis platform 220 may scan an article to determine the type of data that was breached and may use this information to update scores for particular fields.

In some implementations, form analysis platform 220 may determine a security feature to be associated with a form (e.g., requiring a credential, such as a username and/or a password, to access the form) based on one or more scores. For example, if a form is associated with a higher risk score, then the form analysis platform 220 may generate the form to require a credential when accessing the form. As another example, if a score for a form satisfies (e.g., exceeds) a threshold, then form analysis platform 220 may analyze the form to segment information from fields into different transmissions. In this case, form analysis platform 220 may select information for each transmission such that a score for the transmission does not satisfy (e.g., does not exceed) the threshold. A recipient device may combine the information from the transmissions. In this way, if one transmission is intercepted or subject to a data breach, the risk of this interception is lower than if all information were included in the transmission.

In some implementations, form analysis platform 220 may determine a type of encryption to be used with a form based on one or more scores. For example, if a form is associated with a higher risk score, then the form analysis platform 220 may encrypt the form. In some implementations, form analysis platform 220 may determine that a recipient device is capable of receiving the form with the encryption before sending the form.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5-27 are diagrams of example implementations 500-2700 relating to example process 400 shown in FIG. 4. FIGS. 5-27 show an example of automated form generation and analysis. As shown in FIGS. 5-27, form analysis platform 220 may provide a user interface which may be displayed (e.g., by client device 210) in various states to facilitate the generation and/or analysis of forms, the generation of scores, the provision of recommendations, and/or the performance of automated actions, as described above.

As shown in FIG. 5, form analysis platform 220 may provide a user interface by which a user can log into an application (e.g., APP 222-1 of FIG. 2, shown as "Privacy Meter Application"). As shown in FIG. 6, form analysis platform 220 may cause the user interface to provide a prompt by which the user can input an industry profile and/or jurisdiction identifier, such as by selecting a geographic region, sector, industry, company name, and/or department. As shown in FIG. 7, form analysis platform 220 may provide an option by which the user can select whether to create and analyze a new form or to analyze an existing form.

As described above, form analysis platform 220 may generate a new form based on receiving input from a user regarding fields to be included in the form and/or data to be gathered using the form. As shown in FIG. 8, form analysis platform 220 may cause the user interface to provide a prompt by which the user may select fields to request a particular type of information (e.g., "Mobile Phone Number"), which may be included in a field category (e.g., "Personal Details" or "Family Details"), and may indicate supporting documentation used to support the provided information (e.g., "Passport"). As shown in FIG. 9, form analysis platform 220 may cause the user interface to display a summary of fields to be included in the form, and to provide a prompt by which the user may add new fields or delete existing fields.

As described above, form analysis platform 220 may generate a form privacy score, which may be determined based on the fields and based on the industry profile and/or government regulations. As shown in FIG. 10, form analysis platform 220 may cause the user interface to display the form privacy score along with a coded level indicator (e.g., a color coded level indicator), a donut chart representing a composition of categories for the form privacy score, and help text explaining the form privacy score. As shown in FIG. 11, form analysis platform 220 may cause the user interface to display the form privacy score for individual fields. As shown in FIG. 12, form analysis platform 220 may cause the user interface to provide a prompt by which the user may provide an indication to accept the form if the form privacy score is acceptable, and/or to send the form to another user for approval.

As described above, form analysis platform 220 may generate a form justification score, which may be determined based on the fields and the form field justifications. As shown in FIG. 13, form analysis platform 220 may cause the user interface to provide a prompt by which the user can indicate a justification for each field. As shown in FIG. 14, form analysis platform 220 may cause the user interface to display the form justification score along with a color coded level indicator, a donut chart representing a composition of categories for the form justification score, and help text explaining the form justification score. As shown in FIG. 15, form analysis platform 220 may cause the user interface to display the form justification score for individual fields.

As described above, form analysis platform 220 may generate an organizational privacy score, which may be determined based on the fields and based on data policies. As shown in FIG. 16, form analysis platform 220 may cause the user interface to provide a prompt by which the user can indicate the organization's data policies. As shown in FIGS. 17-18, form analysis platform 220 may cause the user interface to display the organizational privacy score along with a color coded level indicator, along with the organizational privacy scores for collection, storage, protection, usage, and access categories.

As described above, form analysis platform 220 may generate an overall privacy score, which may be calculated based on a combination of two or more of the form privacy score, the form justification score, and the organizational privacy score. As shown in FIG. 19 and FIG. 20, form analysis platform 220 may cause the user interface to display a visualization of the overall privacy score.

As described above, form analysis platform 220 may compare forms and/or scores for forms and may select a form that best satisfies a combination of requirements, may generate a combined form score, may generate a field combination score, and/or may generate a benchmarking score. As shown in FIG. 21, form analysis platform 220 may cause the user interface to display a visualization of the comparison of scores. As shown in FIG. 22, form analysis platform 220 may cause the user interface to display a visualization of the combined form score. As shown in FIG. 23, form analysis platform 220 may cause the user interface to display a visualization of the field combination score. As shown in FIGS. 24-25, form analysis platform 220 may cause the user interface to display a visualization of the benchmarking score for the overall privacy score, the form privacy score, the form justification score, and the organizational privacy score.

As described above, form analysis platform 220 may generate recommendations. As shown in FIG. 26, form analysis platform 220 may cause the user interface to display organizational level recommendations. As shown in FIG. 27, form analysis platform 220 may cause the user interface to display form level recommendations.

As indicated above, FIGS. 5-27 are provided merely as an example. Other examples are possible and may differ from what was described with regard to FIGS. 5-27.

Implementations described herein use a form analysis platform, implemented within a cloud computing environment, to generate and analyze forms using well-defined rules, and to provide an accurate assessment of the level of risk associated with forms used to obtain potentially sensitive data. In some implementations, the form analysis platform uses natural language processing, artificial intelligence, machine learning, big data analysis, web crawling, or another automated technique to more accurately determine the level of risk, to provide recommendations regarding a form, to perform an automated action for a form, or the like. By using these automated techniques, the form analysis platform provides an accurate and objective analysis of forms, provides a more consistent analysis of forms so that multiple forms can be compared, and improves security by reducing the likelihood and impact of data breaches associated with data obtained using the forms.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive form analysis information to be used to analyze a computer-implemented form for an organization, the form analysis information including:
an industry profile associated with the organization,
a government regulation that governs the organization, and
a plurality of form field justifications for a plurality of fields in the computer-implemented form, where each respective form field justification, of the plurality of form field justifications, indicates a justification for including a corresponding field, of the plurality of fields, in the computer-implemented form,
the justification indicating why the organization is gathering data using the corresponding field;
analyze the computer-implemented form based on the form analysis information and based on the plurality of fields included in the computer-implemented form,
the plurality of fields being used to receive user input via the computer-implemented form;
generate scores for the plurality of fields based on analyzing the computer-implemented form,
the scores being generated using a predictive model,
the predictive model predicting an impact of a particular field type on a risk level for the organization,
the particular field type being based on a particular combination of:
information associated the industry profile,
information associated with the government regulation, and
information associated with the justification for a respective field of the plurality of fields,
the scores including a risk score generated using the predictive model;
determine that an overall privacy score, of the scores, satisfies a threshold,
the overall privacy score being calculated based on:
a form privacy score,
a form justification score, and
an organization privacy score;
automatically remove a field of the plurality of fields from the computer-implemented form or automatically add a field to the computer-implemented form based on determining that the overall privacy score satisfies the threshold;
perform web crawling to identify a news article relating to the computer-implemented form;
analyze the news article using natural language processing; and
update the scores based on analyzing the news article using natural language processing.

2. The device of claim 1, where the threshold is determined based on user input that indicates an acceptable score for the computer-implemented form.

3. The device of claim 1, where the one or more processors are to:
obtain the computer-implemented form by crawling one or more websites.

4. The device of claim 1, where the one or more processors are further to:
replace a first field, included in the computer-implemented form, with a second field.

5. The device of claim 1, where the one or more processors, when analyzing the computer-implemented form, are to:
perform natural language processing to identify the plurality of fields included in the computer-implemented form.

6. The device of claim 1, where the risk score is generated based on one or more forms for related organizations.

7. The device of claim 1, where the one or more processors are further to:
determine a security feature that is to be associated with the computer-implemented form, where the security feature includes a credential.

8. A method, comprising:
obtaining, by one or more devices, form analysis information to be used to analyze a form for an organization, the form analysis information including:
an industry profile associated with the organization,
a government regulation that governs the organization, and
a plurality of form field justifications for a plurality of fields in the form, where each respective form field justification, of the plurality of form field justifications, indicates a justification for including a corresponding field, of the plurality of fields, in the form, the justification indicating why the organization is gathering data using the corresponding field;

analyzing, by the one or more devices, the form based on the form analysis information and based on the plurality of fields included in the form,
the plurality of fields being used to receive user input via the form;

generating, by the one or more devices, scores for the plurality of fields based on analyzing the form,
the scores being generated using a predictive model,
the predictive model predicting an impact of a particular field type on a risk level for the organization,
the particular field type being the scores being generated based on a particular combination of:
information associated with the industry profile,
information associated with the government regulation, and
information associated with the justification for a respective field of the plurality of fields,
the scores including a risk score generated using the predictive model;

determining, by the one or more devices, that an overall privacy score, of the scores, satisfies a threshold,
the overall privacy score being calculated based on:
a form privacy score,
a form justification score, and
an organization privacy score;

automatically removing, by the one or more devices, a field of the plurality of fields from the form or automatically adding a field to the form based on determining that the overall privacy score satisfies the threshold;

performing, by the one or more devices, web crawling to identify a news article relating to the form;

analyzing, by the one or more devices, the news article using natural language processing; and updating, by the one or more devices, the scores based on analyzing the news article using natural language processing.

9. The method of claim 8, further comprising:
determining a website associated with the organization; and
where obtaining the form analysis information comprises:
obtaining the form analysis information by crawling the website and using natural language processing.

10. The method of claim 8, where the form analysis information further includes information associated with one or more organizations that are related to the organization.

11. The method of claim 8, where the form analysis information further includes information that identifies one or more data policies of the organization.

12. The method of claim 11, where the scores include:
an organizational privacy score that represents a level of privacy risk associated with data policies of the organization,
the organizational privacy score being determined based on the plurality of fields and the one or more data policies.

13. The method of claim 8, where the scores include:
a field combination score that represents a level of risk associated with a combination of fields included in the form.

14. The method of claim 8, where the risk score is generated based on one or more forms for related organizations.

15. A non-transitory computer-readable medium storing instructions, the instructions comprising:
one or more instructions that, when executed by one or more processors, cause the one or more processors to:
receive form analysis information to be used to analyze a potential form for an organization, the form analysis information including at least one of:
an industry profile associated with the organization,
a government regulation that governs the organization, or
a plurality of form field justifications for a plurality of fields in the potential form, where each respective form field justification, of the plurality of form field justifications, indicates a justification for including a corresponding field, of the plurality of fields, in the potential form,
the justification indicating why the organization is gathering data using the corresponding field;
analyze the potential form based on the form analysis information and based on the plurality of fields to be included in the potential form,
the plurality of fields being used to receive user input via the potential form;
generate scores for the plurality of fields based on analyzing the potential form,
the scores being generated using a predictive model,
the predictive model predicting an impact of a particular field type on a risk level for the organization,
the particular field type being the scores being generated based on a particular combination of:
information associated with the industry profile,
information associated with the government regulation, and
information associated with the justification for a respective field of the plurality of fields,
the scores including a risk score generated using the predictive model;
determine that an overall privacy score, of the scores, satisfies a threshold,
the overall privacy score being calculated based on:
a form privacy score,
a form justification score, and
an organization privacy score;
automatically remove a field of the plurality of fields from the potential form or automatically add a field to the potential form based on determining that the overall privacy score satisfies the threshold;
perform web crawling to identify a news article relating to the potential form;
analyze the news article using natural language processing; and
update the scores based on analyzing the news article using natural language processing.

16. The non-transitory computer-readable medium of claim 15, where the one or more instructions, when executed by the one or more processors, further cause the one or more processors to:
provide one or more recommendations associated with the potential form.

17. The non-transitory computer-readable medium of claim 16, where the one or more instructions, that cause the one or more processors to provide the one or more recommendations, cause the one or more processors to:
provide a recommendation to:
replace a first field, included in the potential form, with a second field.

18. The non-transitory computer-readable medium of claim 15, where the one or more instructions, when executed by the one or more processors, further cause the one or more processors to:
compare a plurality of scores for a plurality of forms including the potential form; and provide a recommendation to use a particular form, of the plurality of forms, based on comparing the plurality of scores for the plurality of forms.

19. The non-transitory computer-readable medium of claim 15, where the one or more instructions, that cause the one or more processors to update the one or more of the scores, cause the one or more processors to:
update a score for a field, included in the potential form, associated with collecting type of information identified in the news article.

20. The non-transitory computer-readable medium of claim 15, where the one or more instructions, when executed by the one or more processors, further cause the one or more processors to:
determine a security feature that is to be associated with the potential form,
where the security feature includes a credential.

* * * * *